United States Patent [19]

Kohda

[11] Patent Number: 6,020,890
[45] Date of Patent: Feb. 1, 2000

[54] TWO-DIMENSIONAL IMAGE DISPLAY DEVICE FOR THREE-DIMENSIONAL COMPUTER GRAPHICS MODEL

[75] Inventor: Youji Kohda, Kawasaki, Japan

[73] Assignee: Fujitsu Limited, Kawasaki, Japan

[21] Appl. No.: 08/825,505

[22] Filed: Mar. 31, 1997

[30] Foreign Application Priority Data

Aug. 12, 1996 [JP] Japan .................................. 8-212265

[51] Int. Cl.$^7$ .................................................. G06T 15/00
[52] U.S. Cl. .............................. 345/419; 345/1; 345/427
[58] Field of Search .................................. 345/139, 419, 345/425, 1 V, 7, 427, 903; 348/36, 38, 52, 839, 840

[56] References Cited

U.S. PATENT DOCUMENTS

| | | | |
|---|---|---|---|
| 5,128,660 | 7/1992 | DeMond et al. | 340/707 |
| 5,495,576 | 2/1996 | Ritchey | 395/125 |
| 5,515,301 | 5/1996 | Corby, Jr. et al. | 364/578 |
| 5,682,506 | 10/1997 | Corby, Jr. et al. | 395/119 |

*Primary Examiner*—Amare Mengistu
*Assistant Examiner*—Mansour M. Said
*Attorney, Agent, or Firm*—Staas & Halsey

[57] ABSTRACT

In a two-dimensional image display device for a three-dimensional computer graphics model, adjacent display screen units are combined by a joint with a sensor. The relative positions or relative angles of the adjacent display screen units are obtained by a sensor, and the result is output to a projection adjusting unit. When a sensor value is changed, the projection adjusting unit changes a viewpoint description and projection plane description in a way that the relative position or relative angle of the display screen unit satisfies the value obtained by the sensor. If the description of a specific projection plane is changed, then the description of the other projection plane is changed to satisfy the sensor value. Based on the changed contents of the viewpoint description unit and the projection plane description unit, a two-dimensional image of the three-dimensional computer graphics model is generated and displayed on the display screen unit.

15 Claims, 25 Drawing Sheets

| X COORDINATE OF POSITION | Y COORDINATE OF POSITION | Z COORDINATE OF POSITION | X ELEMENT OF DIRECTION | Y ELEMENT OF DIRECTION | Z ELEMENT OF DIRECTION |
|---|---|---|---|---|---|

F I G. 4

| X COORDINATE OF POSITION | Y COORDINATE OF POSITION | Z COORDINATE OF POSITION | X ELEMENT OF DIRECTION | Y ELEMENT OF DIRECTION | Z ELEMENT OF DIRECTION |
|---|---|---|---|---|---|

F I G. 5

| X COORDINATE OF POSITION $O_1$ | Y COORDINATE OF POSITION $O_1$ | Z COORDINATE OF POSITION $O_1$ |
|---|---|---|
| X COORDINATE OF POSITION $O_2$ | Y COORDINATE OF POSITION $O_2$ | Z COORDINATE OF POSITION $O_2$ |
| X COORDINATE OF POSITION $O_3$ | Y COORDINATE OF POSITION $O_3$ | Z COORDINATE OF POSITION $O_3$ |
| ⋮ | ⋮ | ⋮ |
| X COORDINATE OF POSITION $O_n$ | Y COORDINATE OF POSITION $O_n$ | Z COORDINATE OF POSITION $O_n$ |

F I G. 6

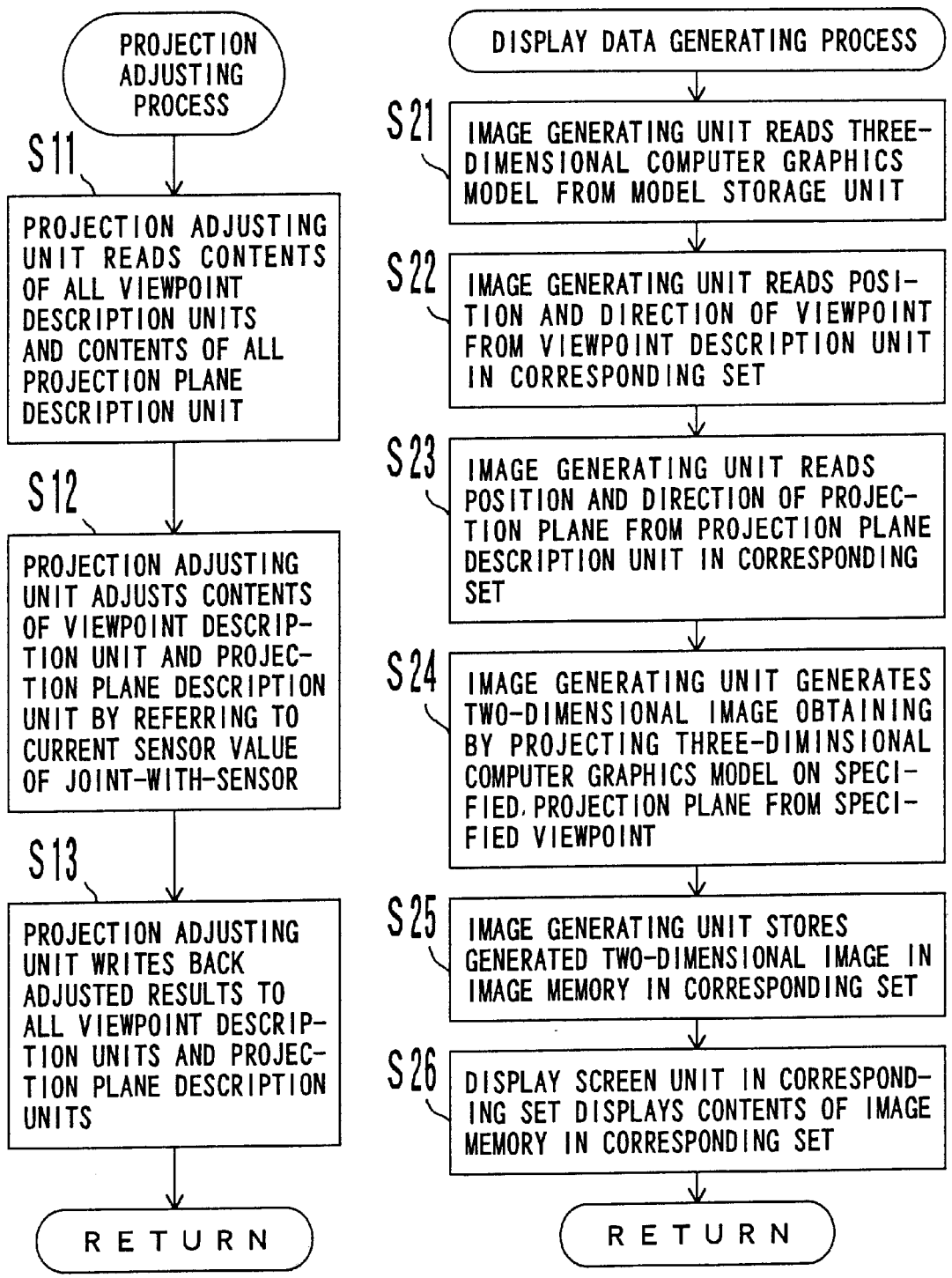

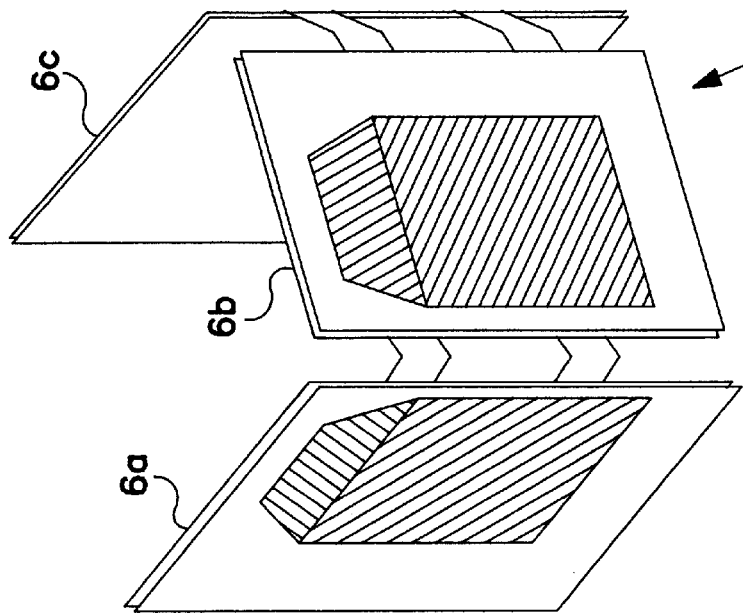
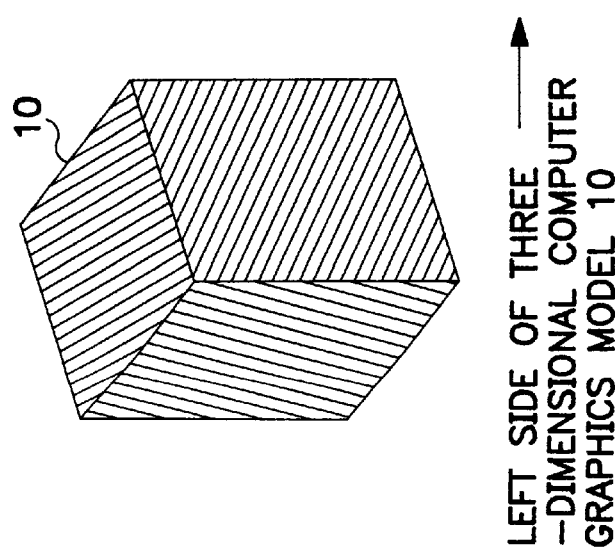
FIG. 23

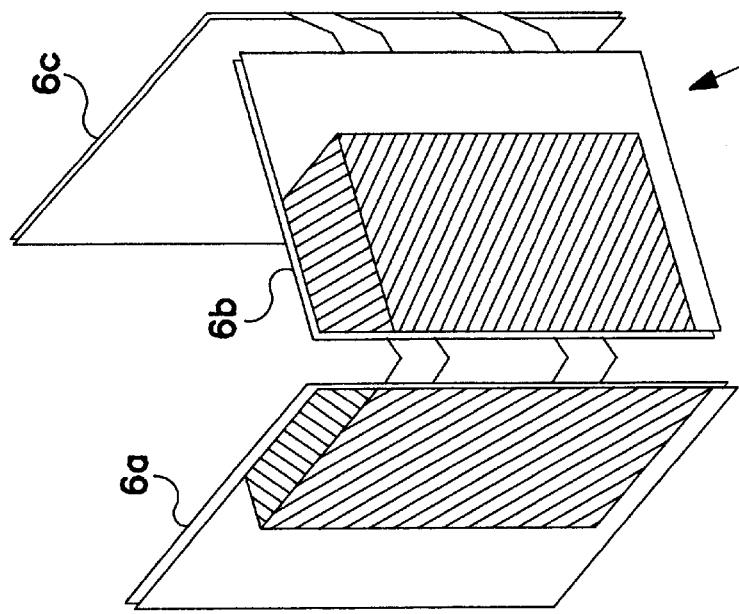
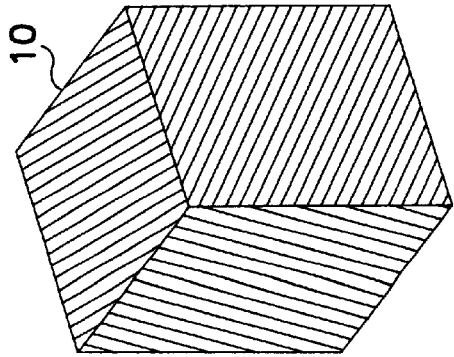
FIG. 24

TWO-DIMENSIONAL IMAGE DISPLAY DEVICE FOR THREE-DIMENSIONAL COMPUTER GRAPHICS MODEL

BACKGROUND OF THE INVENTION

1. Field of the Invention

The present invention relates to an image display device for visually observing a three-dimensional computer graphics model.

It is considered that a device, through which a user can feel as if he or she were freely moving in a virtual environment structured with three-dimensional computer graphics models, is effective if the virtual environment can be viewed from a desired position and direction. Furthermore, when a large volume of a three-dimensional object is observed, it is considered that the device is more effective if a three-dimensional computer graphics is produced for the object to allow the user to freely view the object from a desired position and direction

2. Description of the Related Art

A three-dimensional object can be observed from a predetermined position and direction by displaying a three-dimensional computer graphics model as an image projected on a two-dimensional plane. Normally, if the user determines the position and direction of a viewpoint and the position and direction on a projection plane, then a projected image can be successfully generated.

A typical conventional technology of displaying an image on a plurality of display screens (display device) is, for example, a CAVE method as disclosed by the following reference.

[Reference] Carolina Cruz-neira, Daniel J. Sandin, Thomas A. Defanti, Rovert V. Kenyon, and John C. Hart: "The Cave audiovisual experience automatic virtual environment", Communications of ACM, Vol. 35, No. 6, pp.65–72 (1992).

The CAVE refers to a category of output device for displaying virtual reality (VR), and a plurality of display devices are arranged around the user. A plurality of display devices display the virtual environment viewed from respective viewpoints of the user. Therefore, the images output to the display devices are different from each other, but represent the entire virtual environment by displaying mutually related images. However, in the CAVE, the relative positions of the display units are fixed.

A portable computer capable of measuring the physical position and direction of the device itself is described below.

[Reference] George W. Fitzmaurice, "Situated information spaces and spatially aware palmtop computers", Communications of ACM, Vo.36, No. 7, pp.39–49 (1993).

This spatially aware palmtop computers are portable computers capable of measuring the physical position and direction of the device. The information about the position and direction of the portable computer is displayed on a display device. However, there is a single display device as in a common computer.

SUMMARY OF THE INVENTION

A three-dimensional object can be observed from a predetermined position and direction by displaying a three-dimensional computer graphics model as an image projected on a two-dimensional plane. If there is only one display screen, the projection plane is moved in various ways to observe the entire image, thereby limiting the observation to a view from one position and direction at a time.

Providing a plurality of display screens to solve the above described problem can be easily hit upon. However, if the relative positions of a plurality of display screens are fixed as in the conventional CAVE, then the relative positions cannot be altered between a display screen and another display screen, that is, the conventional method cannot deal with a dynamic change in position on the display screen by, for example, changing the position or the angle of a specific display screen, etc., thereby limiting the field of application of the image display device.

If a plurality of display screens are provided to respectively deal with projection planes, then a limitation that an object is viewed from a single position and direction as a time can be removed. However, only respectively operating a plurality of projection planes cannot produce an entirely coordinated visual effect obtained by viewing a common three-dimensional computer graphics model through a plurality of projection planes.

The present invention aims at solving the above listed problems and providing a device for increasing the coordinated visual effect when an object is viewed using a plurality of display screens by a user's optionally changing the relative positions or relative angles of the plurality of display screens, and for easily and correctly recognizing a three-dimensional computer graphics model projected on a two-dimensional plane.

BRIEF DESCRIPTION OF THE DRAWINGS

FIG. 4 shows the structure of the data of the viewpoint description unit;

FIG. 5 shows the structure of the data of the projection plane description unit;

FIG. 6 shows the structure of the date of the model storage unit;

FIG. 8A is a flowchart showing the process of adjusting the projection;

FIG. 8B is a flowchart showing the process of generating display data;

FIG. 23 shows a display example;

FIG. 24 shows a display example;

DESCRIPTION OF THE PREFERRED EMBODIMENTS

The present invention comprises a plurality of display screens on which an image is displayed by projecting a three-dimensional computer graphics model on a two-dimensional projection plane to implement a system of adjusting the position and direction of a viewpoint and the positions and directions of a plurality of projection planes in real time based on the relative positions of a plurality of display screens. The relative positions of the plurality of display screens can be obtained by combining the adjacent display screens using a joint provided with a sensor and measuring the relative position and angle (direction) using the sensor.

Figure 1:
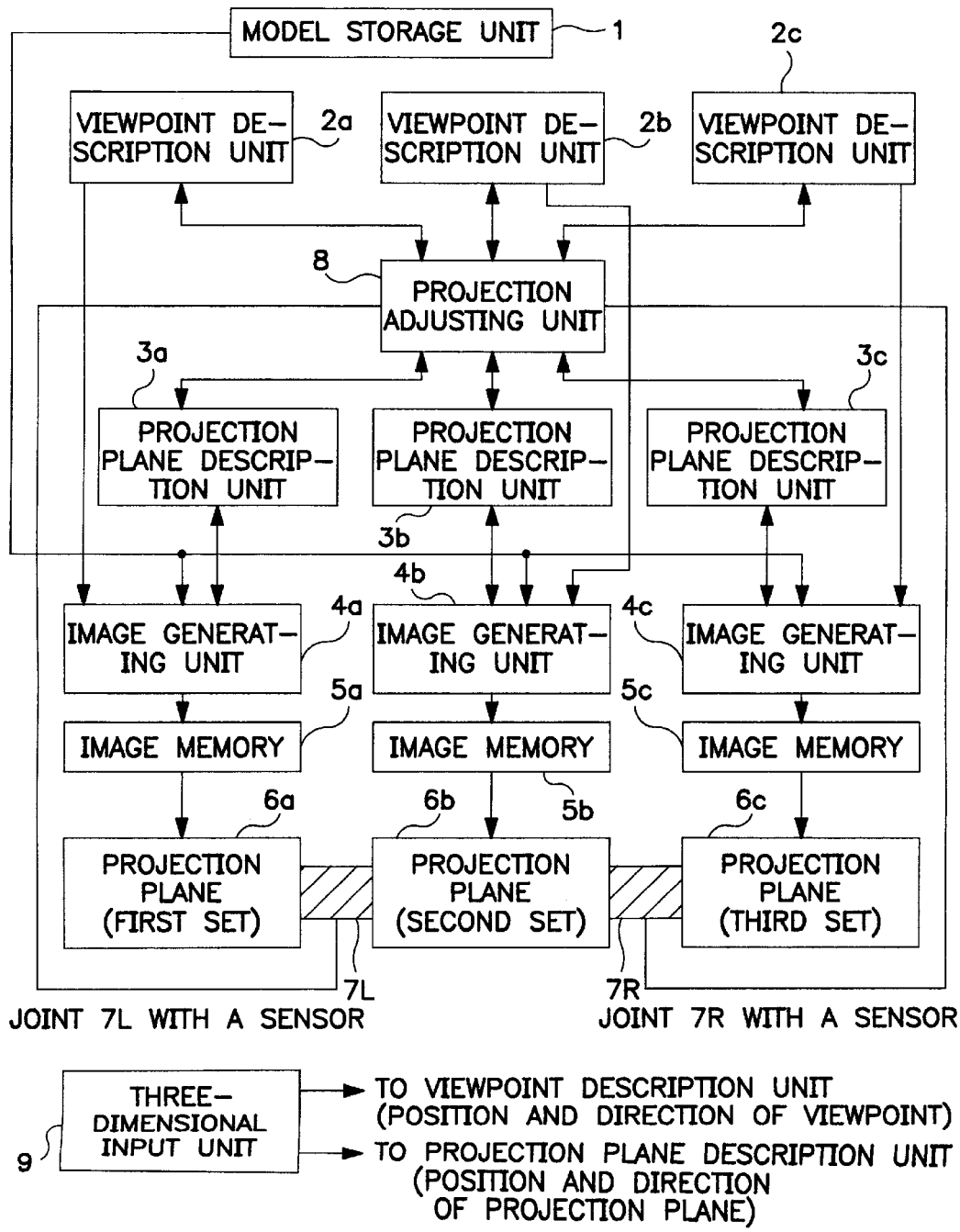
FIG. 1 is a block diagram showing the two-dimensional image display device according to the present invention.

FIG. 1 shows an example of the configuration according to the present invention. In FIG. 1, 1 is a model storage unit, 2 (2a, 2b, and 2c) is a viewpoint description unit, 3 (3a, 3b, and 3c) is a projection plane description unit, 4 (4a, 4b, and 4c) is an image generating unit, 5 (5a, 5b, and 5c) is an image memory, 6 (6a, 6b, and 6c) is a display screen unit, 7L and 7R are joints with sensors, 8 is a projection adjusting unit, and 9 is a three-dimensional input unit.

A device is organized by the projection plane description unit 3, image generating unit 4, image memory 5, and display screen unit 6, or by these units further provided with the viewpoint description unit 2. The device is provided for each of the display screen units 6. In FIG. 1, since three display screen units 6a through 6c are provided, three sets of devices each comprising the units from the viewpoint description unit 2 to the image memory 5. The number of the display screen units 6 is not limited to 3 as long as a plurality of display screen units 6 are provided. In FIG. 1, a, b, and c added to each unit number of the viewpoint description unit 2, projection plane description unit 3, image generating unit 4, image memory 5, and display screen unit 6 refer to the same unit forming part of respective devices.

The model storage unit 1 stores a three-dimensional computer graphics model.

The viewpoint description unit 2 stores the position and direction of an observation point (referred to as a viewpoint) when the image generating unit 4 generates a two-dimensional image of the three-dimensional computer graphics model stored in the model storage unit 1.

The projection plane description unit 3 stores the position and direction of the plane (projection plane) on which the two-dimensional image of a three-dimensional computer graphics model stored in the model storage unit 1 is projected. The position and direction of the projection plane are normally defined by the absolute coordinate of the three-dimensional virtual space in which the three-dimensional computer graphics model is placed. The position and direction of the viewpoint stored in the viewpoint description unit 2 can be defined either by the absolute coordinate of the three-dimensional virtual space or in relation to the position and direction of the corresponding projection plane.

The image generating unit 4 generates, as a two-dimensional image for each projection plane, an image obtained by projecting the three-dimensional computer graphics model stored in the model storage unit 1 on a projection plane placed at the position and in the direction specified by the projection plane description unit 3 from the viewpoint and direction specified by the viewpoint description unit 2.

The image memory 5 stores a two-dimensional image generated by the image generating unit 4.

The display screen unit 6 displays the contents of the image memory 5 for the user.

The joints 7L and 7R with sensors has a mobile mechanism in which the relative positions or angles of adjacent display screen units 6a and 6b or 6b and 6c can be optionally adjusted, and is provided with respective sensors for measuring the relative positions and angles of the adjacent display screens of the display screen units 6a and 6b or 6b and 6c, and transmits the sensor value to the projection adjusting unit 8.

The projection adjusting unit 8 refers to the relative positions and angles of adjacent display screen units 6 measured by the joints 7L and 7R with sensors, and adjusts in real time the position and direction stored by the viewpoint description unit 2 or the position and direction of the projection plane stored by the projection plane description unit 3.

That is, the projection adjusting unit 8 reads the contents of all the viewpoint description units 2a through 2c and projection plane description units 3a through 3c, and the current sensor values from the joints 7L and 7R with sensors, refers to the relative positions or angles of the display screen units 6 based on the sensor values, adjusts the contents of the viewpoint description units 2a through 2c or projection plane description units 3a through 3c, and then writes back the adjusted values to the viewpoint description units 2a through 2c and the projection plane description units 3a through 3c.

The three-dimensional input unit 9 inputs the position and direction of the viewpoint or the position and direction of the projection plane depending on the mouse, keyboard, or other units, and writes the input values to one of the viewpoint description units 2a through 2c (for example, the viewpoint description unit 2b) or one of the projection plane description units 3a through 3c.

If a part of the contents of the viewpoint description unit 2 or projection plane description unit 3 is altered by the three-dimensional input unit 9, then the projection adjusting unit 8 automatically updates the contents of the related viewpoint description unit 2 or projection plane description unit 3 based on the sensor values from the joints 7L and 7R with sensors in a way that the relative positions of the display screen unit 6 corresponding to the altered viewpoint or projection plane and other display screen units 6 can be appropriately maintained.

The present invention functions as follows.

The model storage unit 1 stores a three-dimensional computer graphics model (three-dimensional CGM) to be displayed.

For example, an application program for a three-dimensional computer graphics model preliminarily sets the position and direction of a viewpoint and the position and direction of a projection plane in the viewpoint description unit 2 and projection plane description unit 3 respectively and issues an instruction to display an image. If there is one viewpoint of the user, the same position value is set in all the viewpoint description units 2a through 2c. If there are a plurality of viewpoints of the user, then respective positions and directions are sets in the viewpoint description units 2a through 2c. In the projection plane description units 3a through 3c, the position and direction of one representative projection plane. The positions and directions of other projection planes are automatically set by the projection adjusting unit 8 based on the sensor values from the joints 7L and 7R with sensors.

Based on the values from the viewpoint description units 2a through 2c and projection plane description units 3a through 3c, the image generating units 4a through 4c generate the two-dimensional images, to be displayed on the display screen units 6a through 6c, of the three-dimensional computer graphics model stored in the model storage unit 1. The generated image is stored in the image memory 5a through 5c. The display screen units 6a through 6c display the two-dimensional images stored in the image memory 5a through 5c respectively.

For example, if the user alters the physical position of the display screen unit 6a, then the joint 7L (with a sensor for combining the display screen units 6a and 6b) detects the relative position or angle of the display screen unit 6a, and transmits the sensor value to the projection adjusting unit 8. Based on the relative position or angle, the projection adjusting unit 8 adjusts the values of the position and direction of the projection plane stored in the projection plane description unit 3a and writes back the values. If necessary, the projection adjusting unit 8 adjusts and writes back the values of the position and direction of the viewpoint stored in the viewpoint description unit 2a.

When the values of the position and direction of the projection plane of the projection plane description unit 3a are changed, the image generating unit 4a generates again the two-dimensional image of the three-dimensional computer graphics model stored in the model storage unit 1, and stores the generated image in the image memory 5a. The display screen unit 6a displays again the stored two-dimensional image.

The viewpoint description unit 2b or projection plane description unit 3b can set or change the value of the position or direction of the viewpoint or the value of the position or direction of the projection plane through the three-dimensional input unit 9. The process similar to that performed when a sensor value is changed is performed when the above described value is changed by unpitying the setting or the change from the three-dimensional input unit 9.

When a two-dimensional image obtained by observing a three-dimensional computer graphics model from one viewpoint is displayed on the image display device including the plurality of display screen units 6a through 6c, the viewpoint description units 2a through 2c store the position of the same viewpoint. If the use of the image display device is limited to the observation from the same viewpoint of the three-dimensional computer graphics model, then there are not only a plurality of viewpoint description units, but there can be only one unit.

Described below is an aspect of the embodiment of the present invention.

Figure 2A:
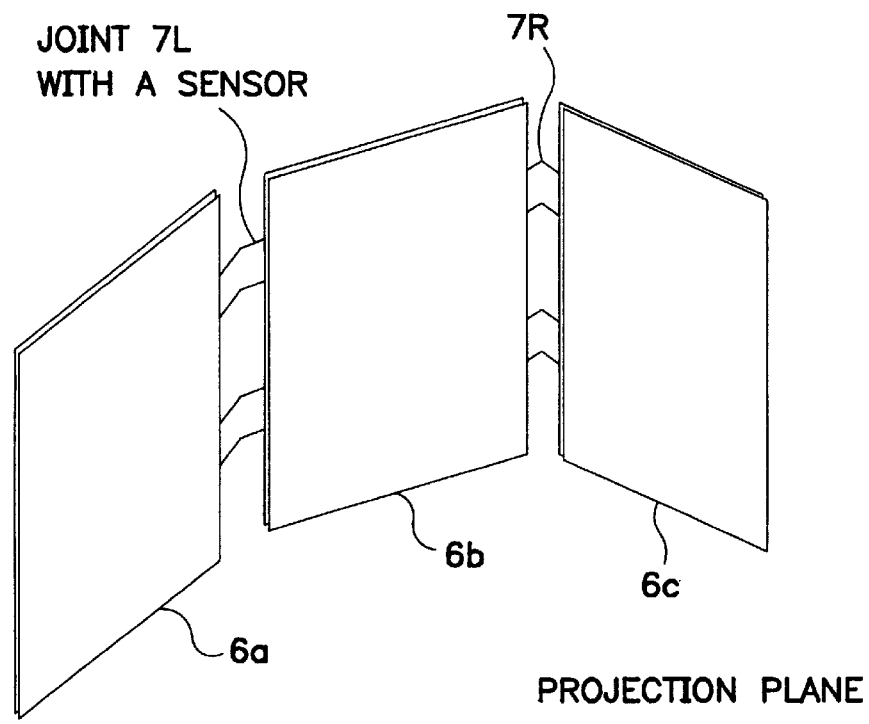
FIGS. 2A and 2B show an example of a display screen unit and a joint 7 with a sensor.
Figure 2B:
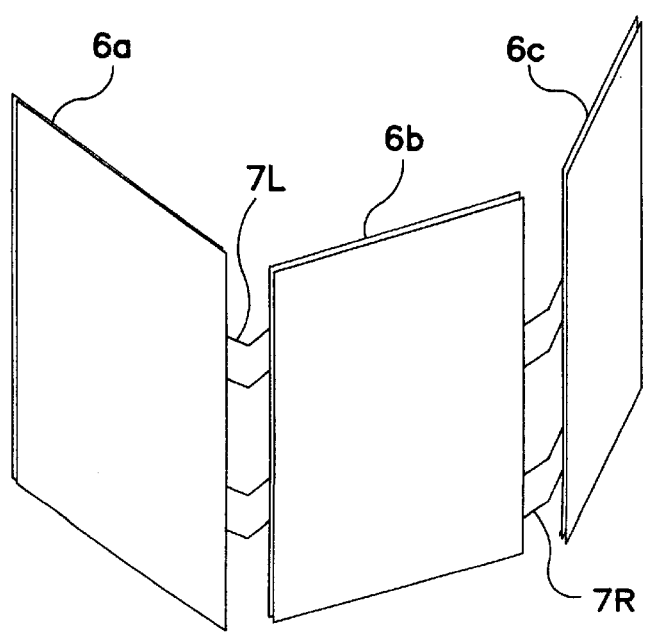

According to an aspect of the present embodiment, there are three display screen units 6 as shown in FIG. 2, and are linearly connected. FIGS. 2A and 2B show an example in which the joints 7L and 7R with sensors capable of changing the relative angle combine the display screen unit 6a with the display screen unit 6b, and the display screen unit 6b with the display screen unit 6c.

Especially, FIG. 2A shows the case where the three display screens of the display screen units 6a through 6c are folded to face inside. This example can be used when a relatively large three-dimensional computer graphics model is viewed from inside. FIG. 2B shows the case where three display screens are folded to face outside. This is an effective method to be followed when a relatively small three-dimensional computer graphics model is observed from outside from various viewpoints.

Figure 3A:
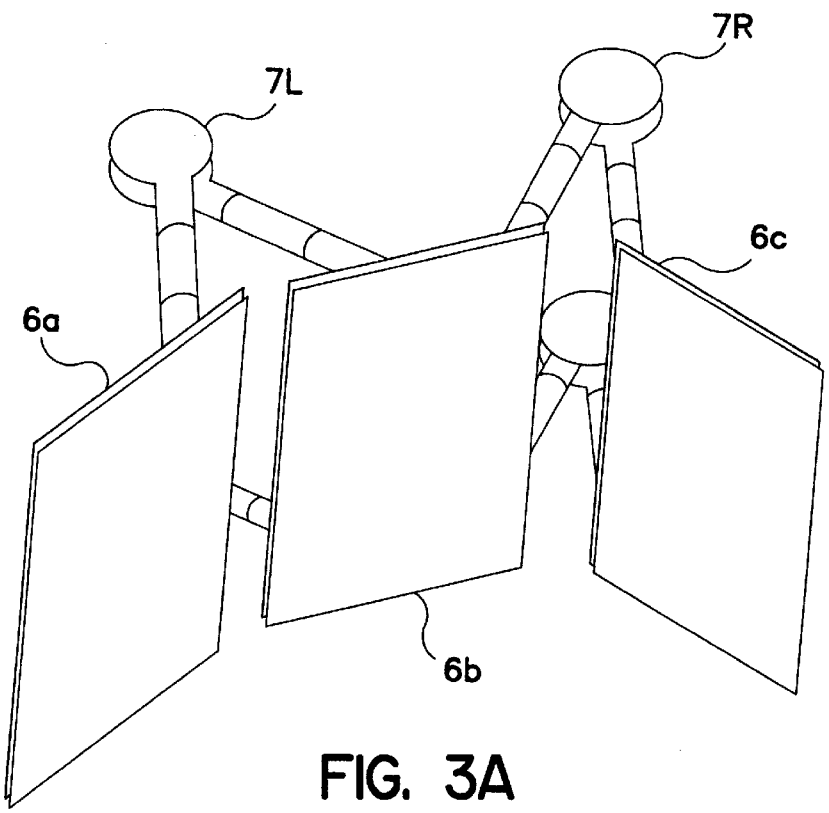
FIGS. 3A and 3B show another example of a display screen unit and a joint 7 with a sensor.
Figure 3B:
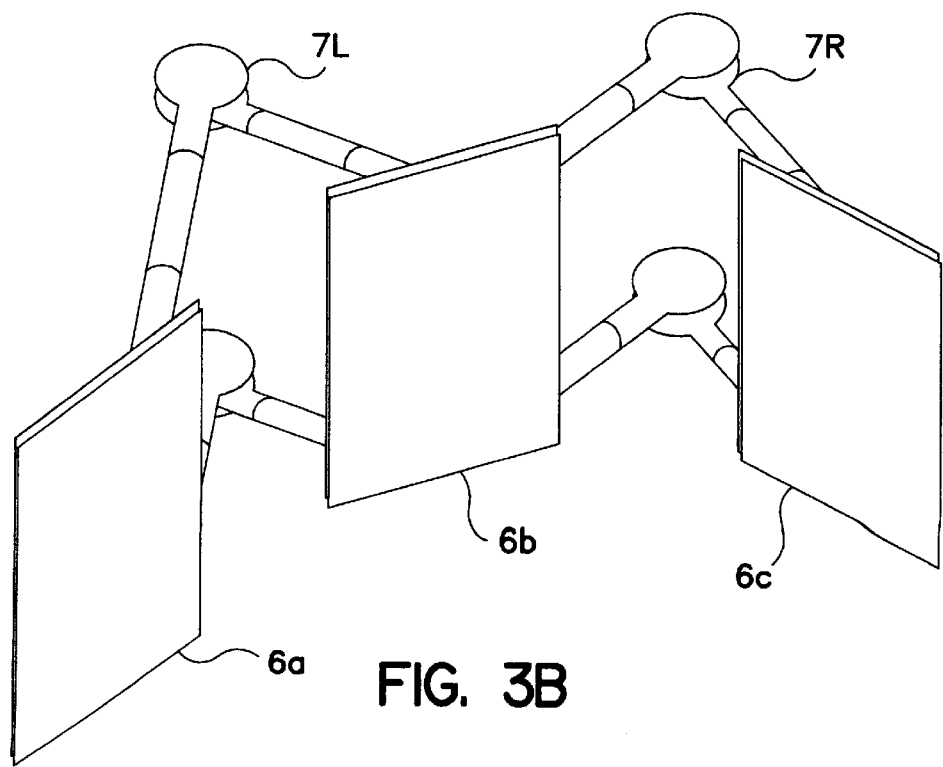

FIGS. 3A and 3B show an example in which the joints 7L and 7R with sensors capable of charging the relative angle and relative position (distance) combine the display screen unit 6a with the display screen unit 6b, and the display screen unit 6b with the display screen unit 6c. In this example, the connectors of the arms of the joints 7L and 7R with sensors, the connectors between the arm of the joint 7L with a sensor and the backs of the display screen units 6a and 6b, and the connectors between the arm of the joint 7R with a sensor and the backs of the display screen units 6b and 6c are rotatable. Therefore, the relative distances as well as the relative angles of the display screen units 6 can be altered. The relative distance can be changed by extending or reducing the arm by, for example, providing arm-length adjusting mechanisms for the joints 7L and 7R with sensors.

The number of the display screen unit 6 is not limited to 3, but can be optionally set to a value equal to or larger than 2. The shape of the display screen unit 6 is not limited to a rectangle, but can be of any shape. The connection between the display screen units 6 is not limited to a linear connection. For example, three rectangular display screens can be connected and arranged in the shape of the letter L. Six square display screens can also be connected and arranged in a die shape.

FIG. 4 shows an example of the structure of the data stored in the viewpoint description unit 2. A three-dimensional computer graphics model is assumed to be placed in a three-dimensional normal coordinate space.

The data of the viewpoint description units 2a through 2c contain 6 actual values including the X, Y, and Z coordinates of the position of a viewpoint, and the X, Y, and Z elements of the view direction. The three actual values (coordinates of the position of the viewpoint) determine the position of the viewpoint in the three-dimensional normal coordinate space, and the remaining three actual values (elements of the direction) specify the direction of the viewpoint in the three-dimensional normal coordinate space.

FIG. 5 shows an example of the structure of the data stored in the projection plane description unit 3. The data contain 6 actual values including the X, Y, and Z coordinates of the position of a projection plane, and the X, Y, and Z elements of the direction of the projection plane. The three actual values (coordinates of the position of the projection plane) determine the position in the three-dimensional normal coordinate space, and the remaining three actual values (elements of the direction) specify the direction in the three-dimensional normal coordinate space. Only one plane is determined as containing the specified position and having a normal line along the specified direction. This plane is defined as a projection plane.

FIG. 6 shows an example of the structure of the data stored in the model storage unit 1. There are various methods of describing a three-dimensional computer graphics model. One method is to list all coordinates of the vertexes of the model. In this method, the data structure of the model storage unit 1 is defined as a set of the coordinates of respective vertexes of the model, that is, the X, Y, and Z coordinates of the position $O_i$ for the i-th vertex $O_i$. The data structure contains a multiple of 3 of actual values. These three actual values determine one position of the vertex of the model in the three-dimensional normal coordinate space. It is obvious that the present invention can be realized by any method of describing a model as long as an image can be generated from the model as being projected on a two-dimensional projection plane.

FIG. 7 is a flowchart showing the process in which the projection adjusting unit 8 observes the changes in relative positions of the display screen units 6a through 6c using the angle sensors or the distance sensors of the joints 7L and 7R with sensors.

Figure 7A:
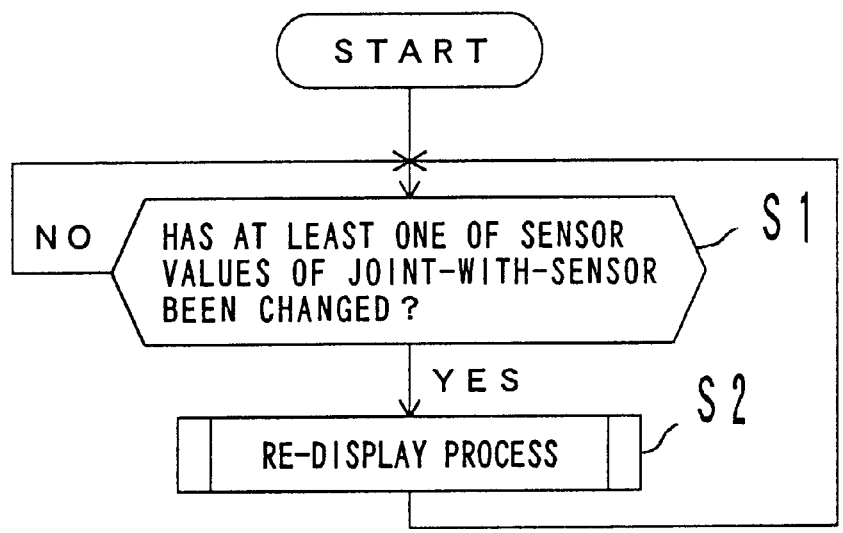
FIGS. 7A and 7B are flowcharts showing the outline of the operations of an embodiment of the present invention.

In FIG. 7A, the projection adjusting unit 8 detects a change when at least one of the sensor values (angles or distances) of the joints 7L and 7R with sensors changes (step S1). When a sensor value changes, a re-display process is performed based on the sensor value (step S2).

Figure 7B:
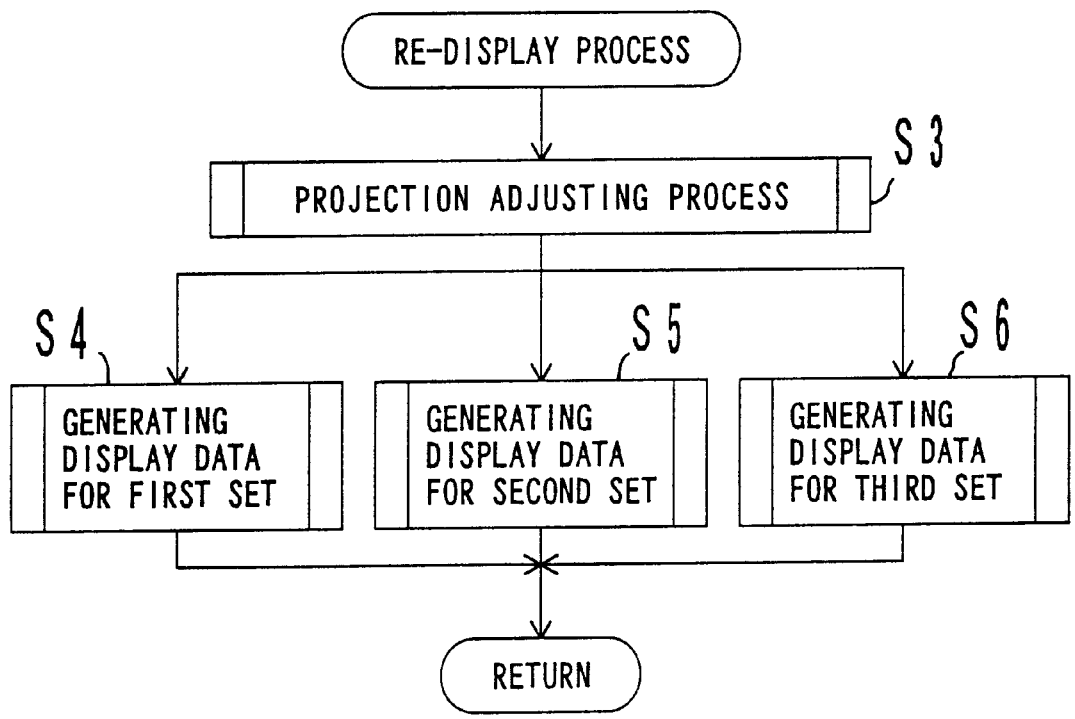

FIG. 7B is a flowchart showing the re-display process in step S2 shown in FIG. 7A.

When the re-display process starts, the projection adjusting unit 8 adjusts the projection (step S3), and the image generating units 4a through 4c generate respective images to be displayed (steps S4, S5, and S6).

FIG. 8A is a flowchart showing the process of adjusting the projection in step S3 shown in FIG. 7B.

The projection adjusting unit 8 reads the contents of all the viewpoint description units 2a through 2c and the contents of all the projection plane description units 3a through 3c (step S11), and refers to the current sensor values of the joints 7L and 7R with sensors, and adjusts the contents of the viewpoint description units 2a through 2c and the projection plane description units 3a through 3c (step S12). Furthermore, the adjusted results are written back to the viewpoint description units 2a through 2c and the projection plane description units 3a through 3c (step S13).

FIG. 8B is a flowchart showing the process of generating display data in steps S4 through S6 shown in FIG. 7B.

The image generating units 4a through 4c read three-dimensional computer graphics models from the model storage unit 1 (step S21), read the positions and directions of the viewpoint from the viewpoint description units 2a through 2c in the corresponding sets (step S22), and then read the positions and directions of the projection plane from the projection plane description units 3a through 3c in the corresponding sets (step S23).

Next, a two-dimensional image is generated by projecting the three-dimensional computer graphics model from the specified viewpoint onto the specified projection plane (step S24). The generated two-dimensional images are stored in the image memory 5a through 5c in the corresponding sets (step S25).

The display screen units 6a through 6c display the contents of the image memory 5a through 5c in the corresponding sets and provide the image for the user (step S26).

Figure 9:
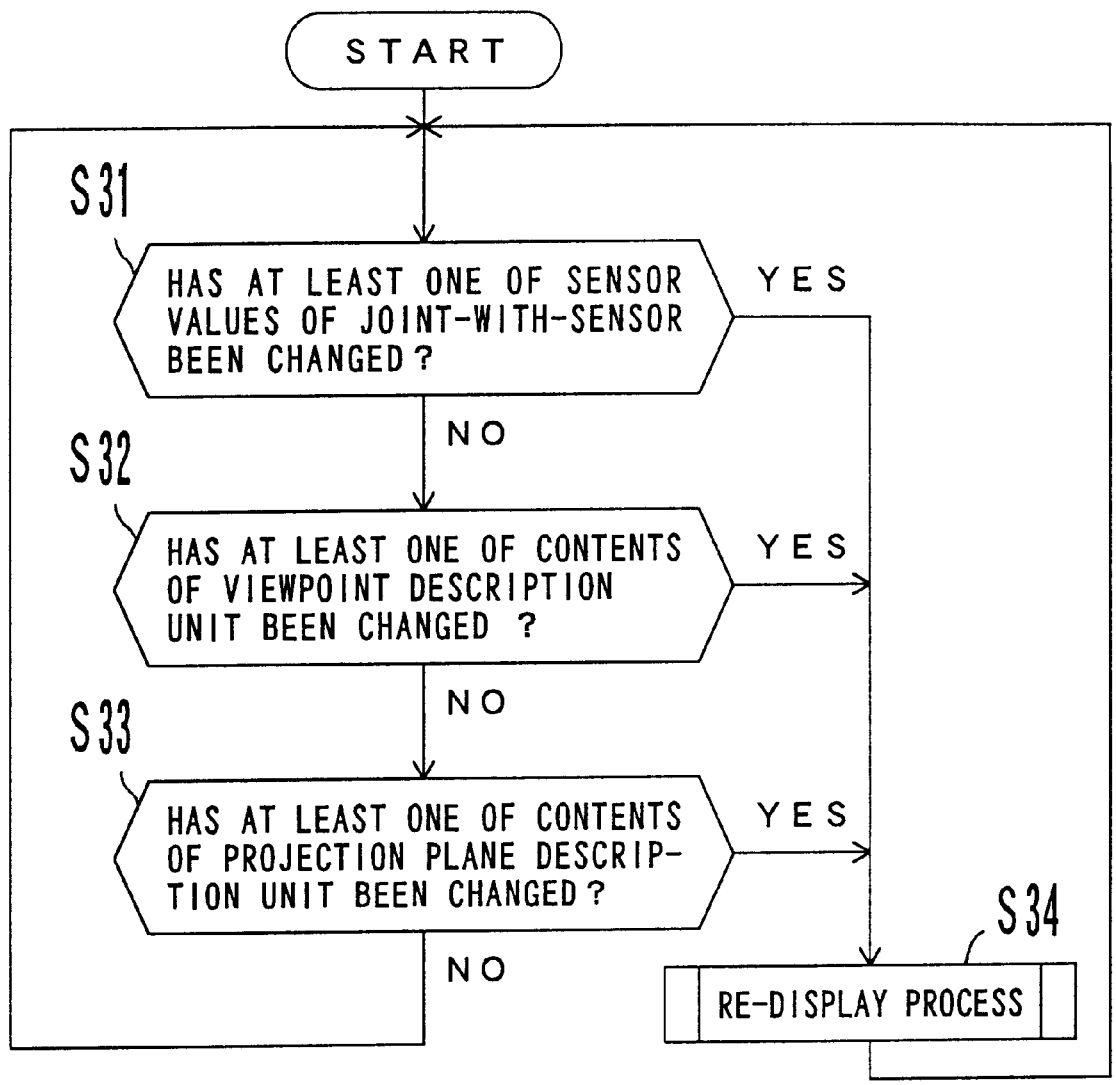
FIG. 9 is a flowchart showing the process of detecting a change in a sensor value, viewpoint description, and projection plane description.

FIG. 9 is a flowchart showing the process performed by the projection adjusting unit 8 when the joints 7L and 7R with sensors detect a change in relative position of the display screen units 6a through 6c or when the three-dimensional input unit 9 sets or alters the positional information of a viewpoint or a projection plane.

The projection adjusting unit 8 checks whether or not at least one of the sensor values from the joints 7L and 7R with sensors has changed (step S31), whether or not at least one of the contents of the viewpoint description units 2a through 2c has changed (step S32), or whether or not at least one of the contents of the projection plane description units 3a through 3c has changed (step S33). If the projection adjusting unit 8 detects the change, it performs the re-display process (step S34). The re-display process is similar to that shown in FIG. 7B.

Figure 10:
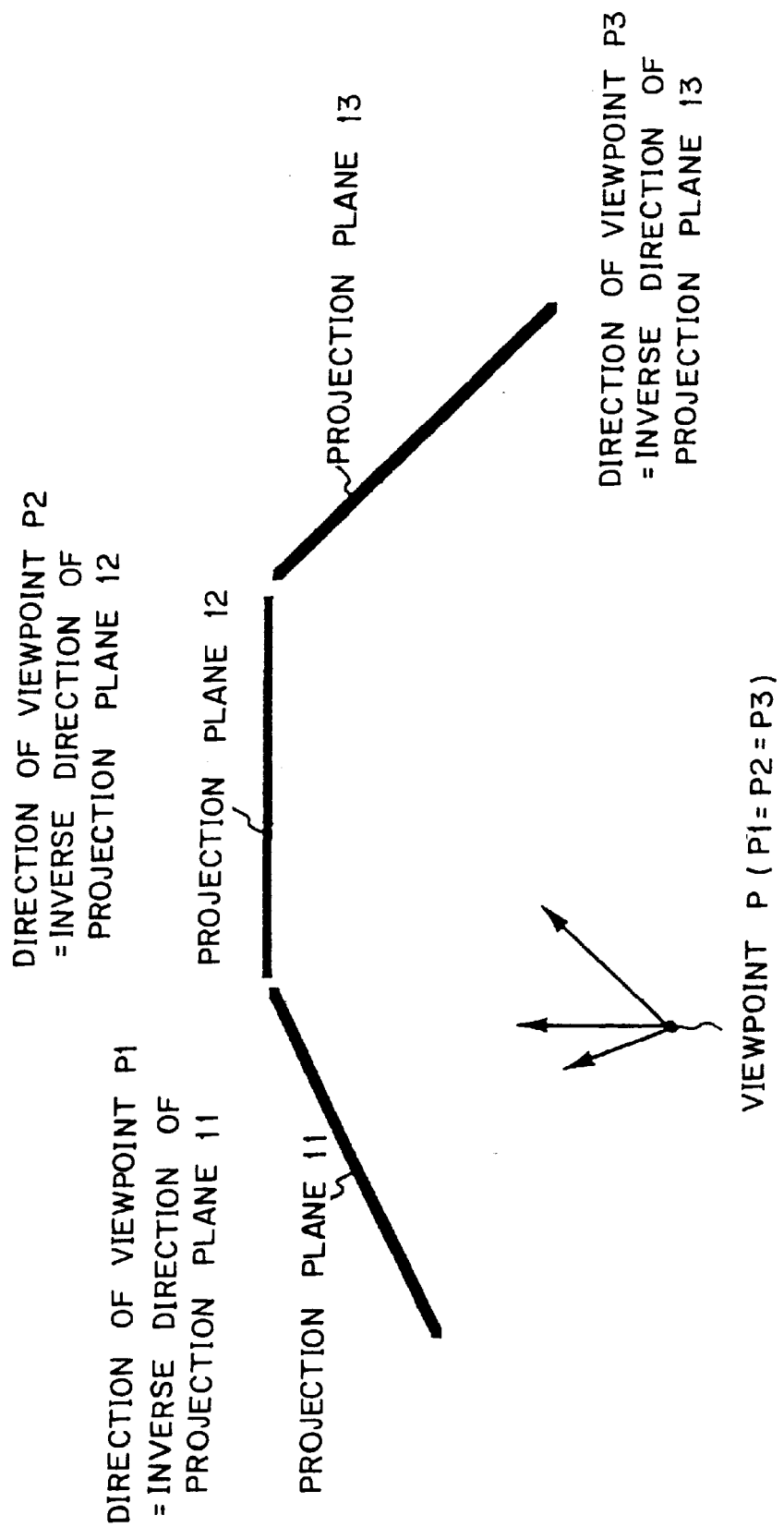
FIG. 10 shows the relationship between a projection plane and a viewpoint according to the first embodiment of the present invention.

FIG. 10 shows an example of adjusting the projection according to the first embodiment.

In FIG. 10, an observation object is assumed to occupy a large space, and can be, for example, a virtual environment built as a three-dimensional computer graphics model. According to the embodiment, such a virtual environment can be appropriately observed, and a large virtual space can be immediately recognized as compared with the method using a single projection plane. Additionally, the user can feel as is he or she were freely getting around in the virtual environment by the user's moving the viewpoint to a desired position.

In this example, the positions of the viewpoints P1, P2, and P3 corresponding to the three projection planes 11, 12, and 13 refer to the same point. The direction of each of the viewpoints P1, P2, and P3 corresponding to the projection planes 11, 12, and 13 is opposite the direction of each of the projection planes 11, 12, and 13 respectively. The projection is performed using a light emitted from the position of the viewpoint P1.

Figure 11:
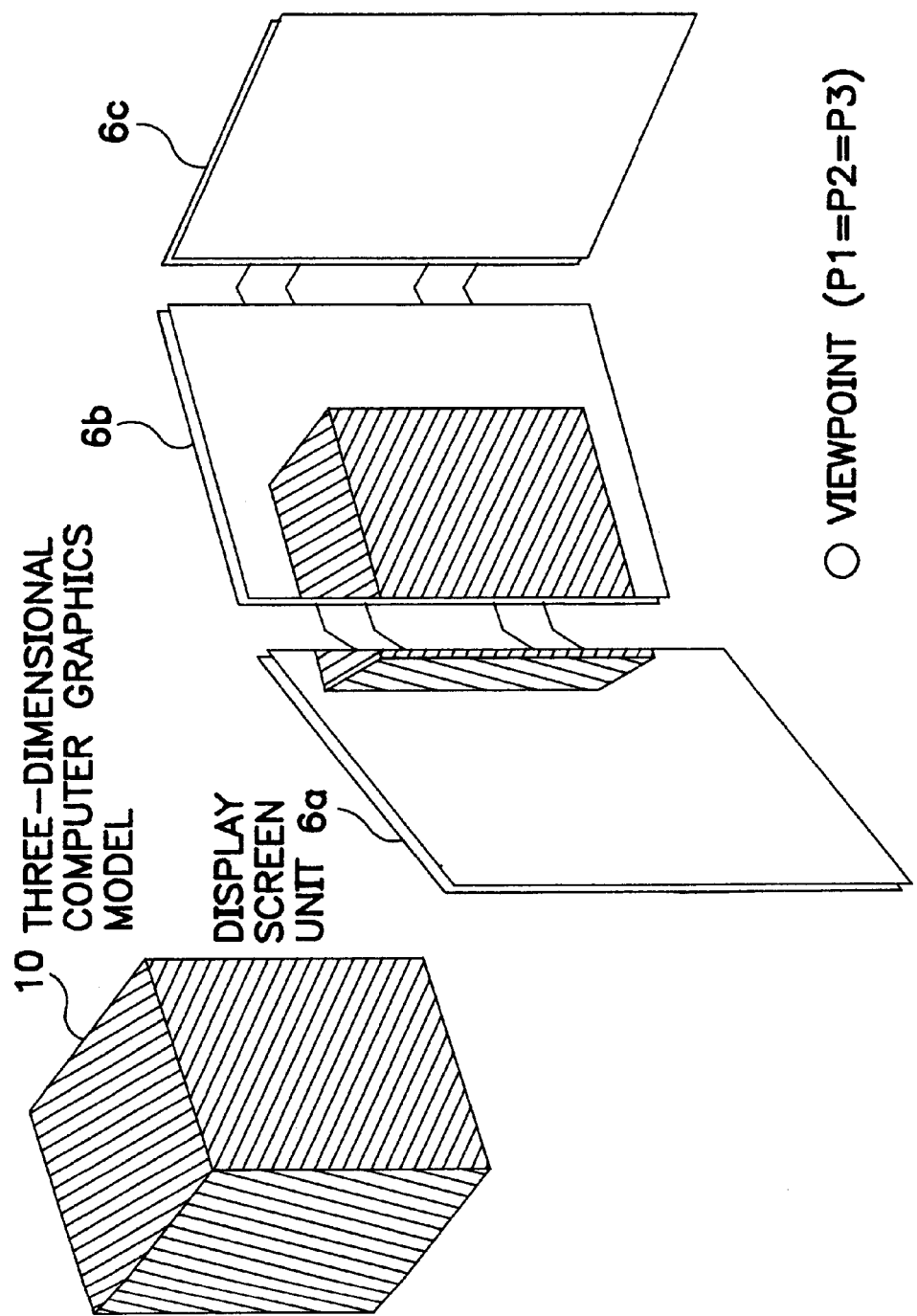
FIG. 11 shows an example of a display.

FIG. 11 shows a display example of adjusting the projection shown in FIG. 10.

The two-dimensional image of the three-dimensional computer graphics model 10 projected onto the projection plane 11, 12, and 13 shown in FIG. 10 is displayed on the display screen units 6a through 6c as shown in FIG. 11. A two-dimensional image obtained by a little obliquely viewing the front of the three-dimensional computer graphics model 10 is displayed on the display screen unit 6b (corresponding to a projection plane 12 shown in FIG. 11). A two-dimensional image obtained by much obliquely viewing the side of the three-dimensional computer graphics model 10 is displayed on the display screen unit 6a (corresponding to a projection plane 11 shown in FIG. 11). The three-dimensional computer graphics model 10 is not displayed on the display screen unit 6c (corresponding to a projection plane 13).

If the user changes the relative positions or angles of the display screen units 6a through 6c, the positions or directions of the projection planes 11 and 13 are automatically adjusted corresponding to the change based on, for example, the projection plane 12.

Described below is the details of the adjustment by the projection adjusting unit 8 according to the first embodiment of the present invention shown in FIG. 10.

Figure 12:
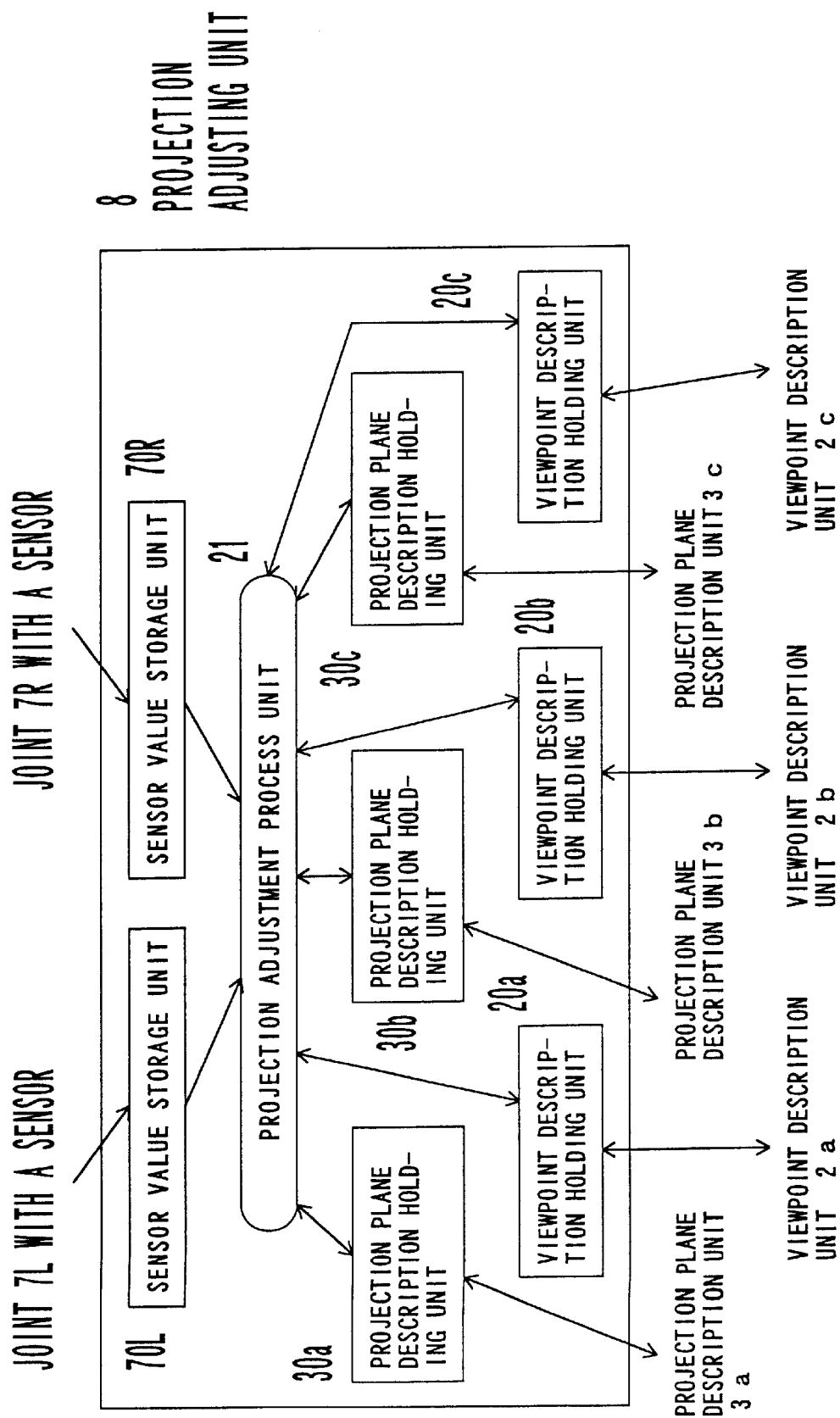
FIG. 12 is a block diagram showing the projection adjusting unit 8.

As shown in FIG. 12, the projection adjusting unit 8 comprises sensor value holding units 70L and 70R for holding a sensor value of the left joint 7L with a sensor at the projection adjustment and a sensor value of the right joint 7R with a sensor at the projection adjustment; projection plane description holding units 30a, 30b, and 30c for holding the values of the projection plane description units 3a, 3b, and 3c respectively obtained at the previous adjustment; and viewpoint description holding units 20a, 20b, and 20c for holding the values of the viewpoint description units 2a, 2b, and 2c respectively obtained at the previous adjustment. A projection adjustment process unit 21 compares the sensor values read from the joints 7L and 7R with sensors with the sensor values stored in the corresponding sensor value holding units 70L and 70R; the values read from the projection plane description units 3a, 3b, and 3c with the values stored in the projection plane description holding units 30a, 30b, and 30c; and the values read from the viewpoint description units 2a, 2b, and 2c with the values stored in the viewpoint description holding units 20a, 20b, and 20c. If the values have been changed, then the descriptions of the projection planes or the descriptions of the viewpoints are rewritten to adjust the projection planes or viewpoints.

The adjusting operation performed by the projection adjustment process unit 21 is described below by referring to the flowcharts of FIGS. 13 through 21.

Figure 13:
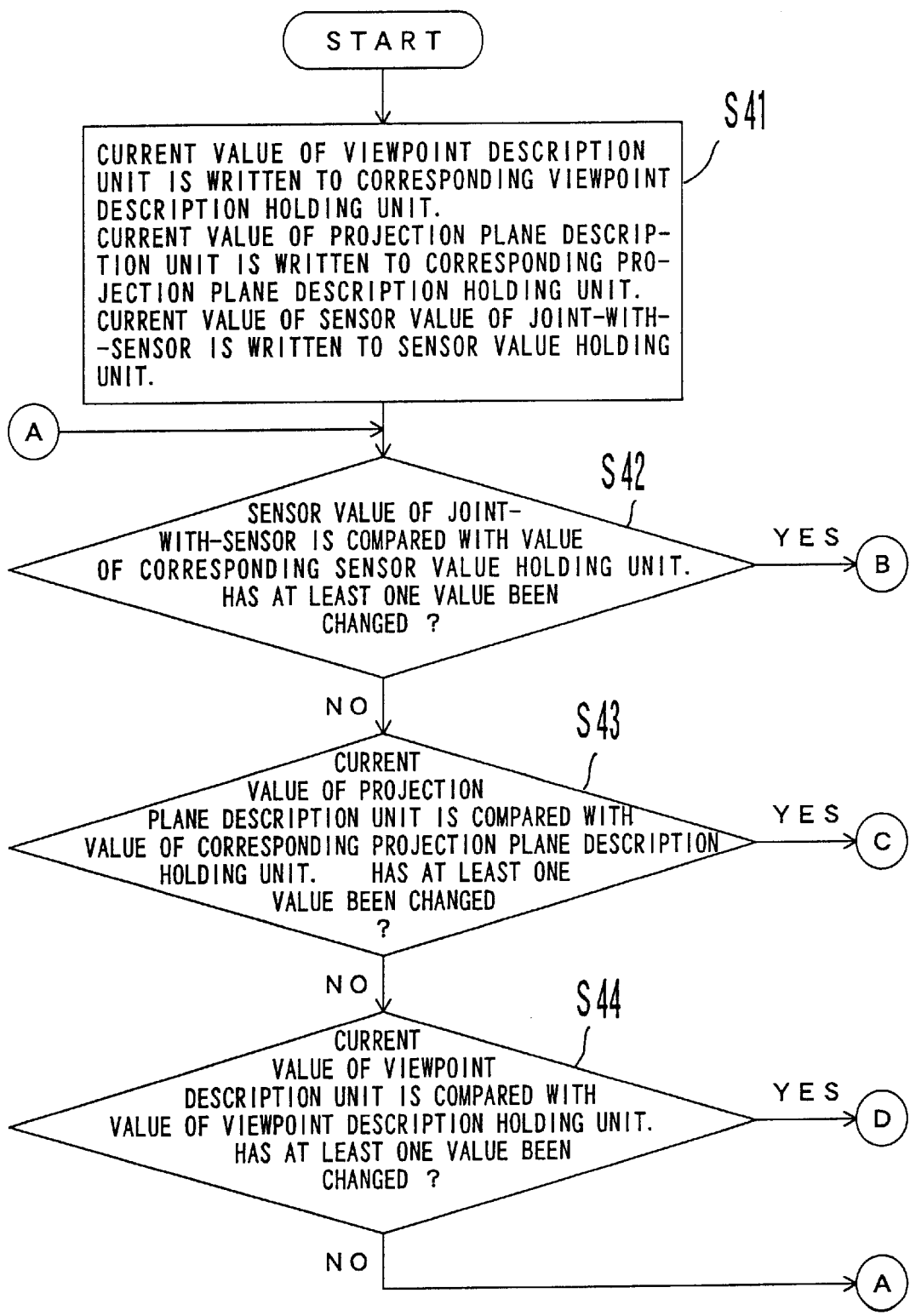
FIG. 13 is a flowchart showing the outline of the operations of the projection adjusting unit 83.

The projection adjustment process unit 21 writes the current values of the viewpoint description units 2a through 2c to the corresponding viewpoint description holding units 20a, 20b, and 20c; the current values of the projection plane description units 3a through 3c to the corresponding projection plane description holding units 30a, 30b, and 30c; and the sensor values of the joints 7L and 7R with sensors to the corresponding sensor value holding units 70L and 70R (step S41 shown in FIG. 13). Thus, the current values are held in the viewpoint description holding units 20a, 20b, and 20c, projection plane description holding units 30a, 30b, and 30c, and the sensor value holding units 70L and 70R. Therefore, the current sensor values to be read next from the joints 7L and 7R with sensors are compared with the previous sensor values stored in the sensor value holding units 70L, 70R, and it is determined whether or not one of the sensors has been changed (step S42).

Figure 14:
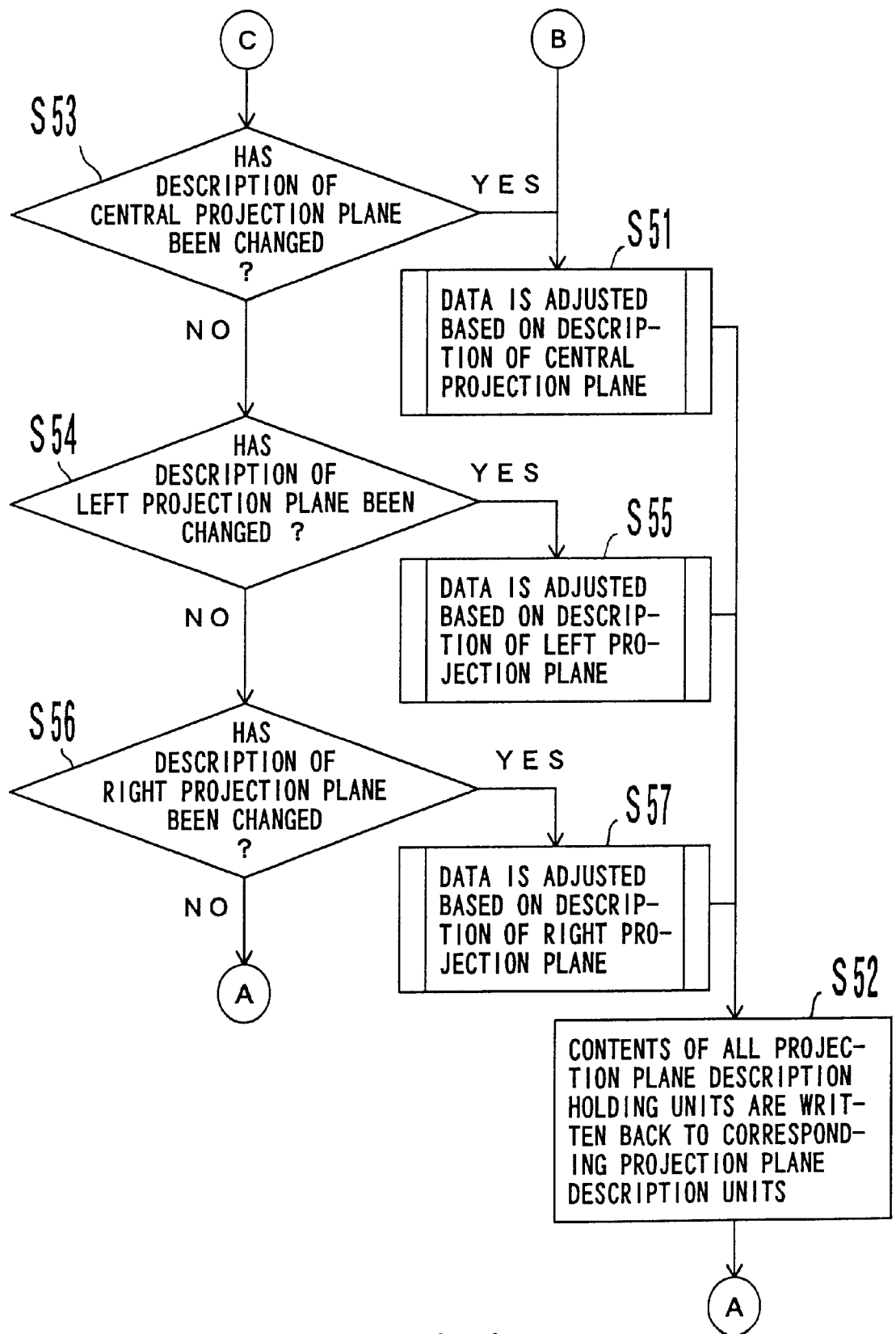
FIG. 14 is a flowchart showing the process of detecting a change in projection plane description.

If one of the sensor values has been changed, then control is passed to step S51 shown in FIG. 14 and the positions of the left and right display screen units 6a, 6c are adjusted based on the central projection plane 6b.

Figure 15:
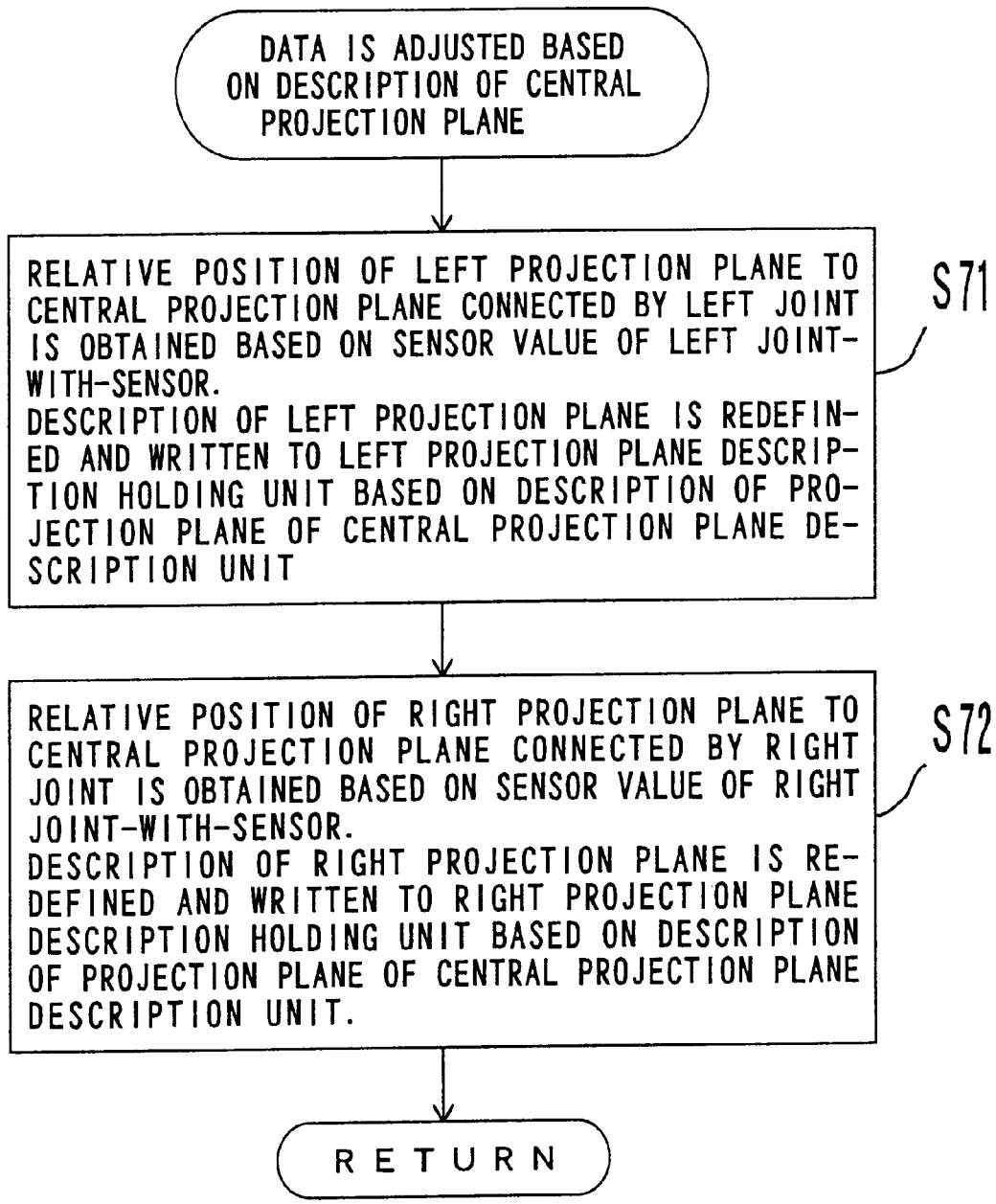
FIG. 15 is a flowchart showing an adjusting process based on the description of the central projection plane.

FIG. 15 is a flowchart showing the contents of the process in step S51. First, based on the sensor value of the left joint 7L with a sensor, the relative position of the left projection plane 6a to the central projection plane 6b connected by the left joint 7L is obtained. Then, from the obtained relative position based on the description of the central projection plane description unit 3b, the position and direction of the left projection plane 6a are obtained. The obtained values are written to the left projection plane description holding unit 30a. (step S71 shown in FIG. 15).

If the position of the left projection plane 6a is set, the relative position of the right projection plane 6c to the central projection plane 6b connected by the right joint 7R is obtained based on the sensor value of the right joint 7R with a sensor. Then, from the obtained relative position based on the description of the central projection plane description unit 3b, the position and direction of the right projection plane 6c are adjusted and the resultant values are written to the right projection plane description holding unit. (step S72 shown in FIG. 15).

In these processes, when the relative position or angle of the joint 7L with a sensor or joint 7R with a sensor is changed and the relative position or angle of a display screen is changed, the left and right projection planes 6a and 6c are determined based on the central projection plane 6b, and the changed values are written to the left projection plane description holding unit 30a and the right projection plane description holding unit 30c.

If the contents of the right and left projection plane description holding units 30a and 30c have been changed, then the contents of all projection plane description holding units 30a, 30b, and 30c are written back to the corresponding projection plane description units 3a through 3c in step S52 shown in FIG. 14. In this process, if the sensor value has been changed, values indicating the new positions of respective projection planes are written to the projection plane description holding units 30a and 30c, and the values are written back to the projection plane description units 3a and 3c and the descriptions of the projection planes 6a and 6c are altered.

If the sensor values of the two joints 7L and 7R with sensors have not been changed back in step S42 shown in FIG. 13, then control is passed to step S43, and the current values of the projection plane description units 3a through 3c are compared with the values of the corresponding projection plane description holding units 30a, 30b, and 30c. Then, it is determined whether or not at least one of the values has been changed.

If one of the current values of the projection plane description units 3a through 3c has been changed, then control is passed to step S53 shown in FIG. 14 and it is determined whether or not the value of the central projection plane description unit 3b has been changed. If the value of the central projection plane description unit 3b has been changed, then control is passed to the above described step S51 and the descriptions of the right and left projection planes 6a and 6c are altered based on the description of the central projection plane. The processes in and after step S51 are the same as those performed when the sensor values of the above described joints 7L and 7R with sensors have been changed.

When the discrimination in step S53 shown in FIG. 14 is NO, that is, the description of the central projection plane 6b has not been changed, then it is discriminated whether or not the description of the left projection plane 6a has been changed in step S54. If the description of the left projection plane has been changed, the positions of the central and right projection planes 6b and 6c are adjusted based on the changed descriptions of the left projection plane 6a (step S55 shown in FIG. 14).

Figure 16:
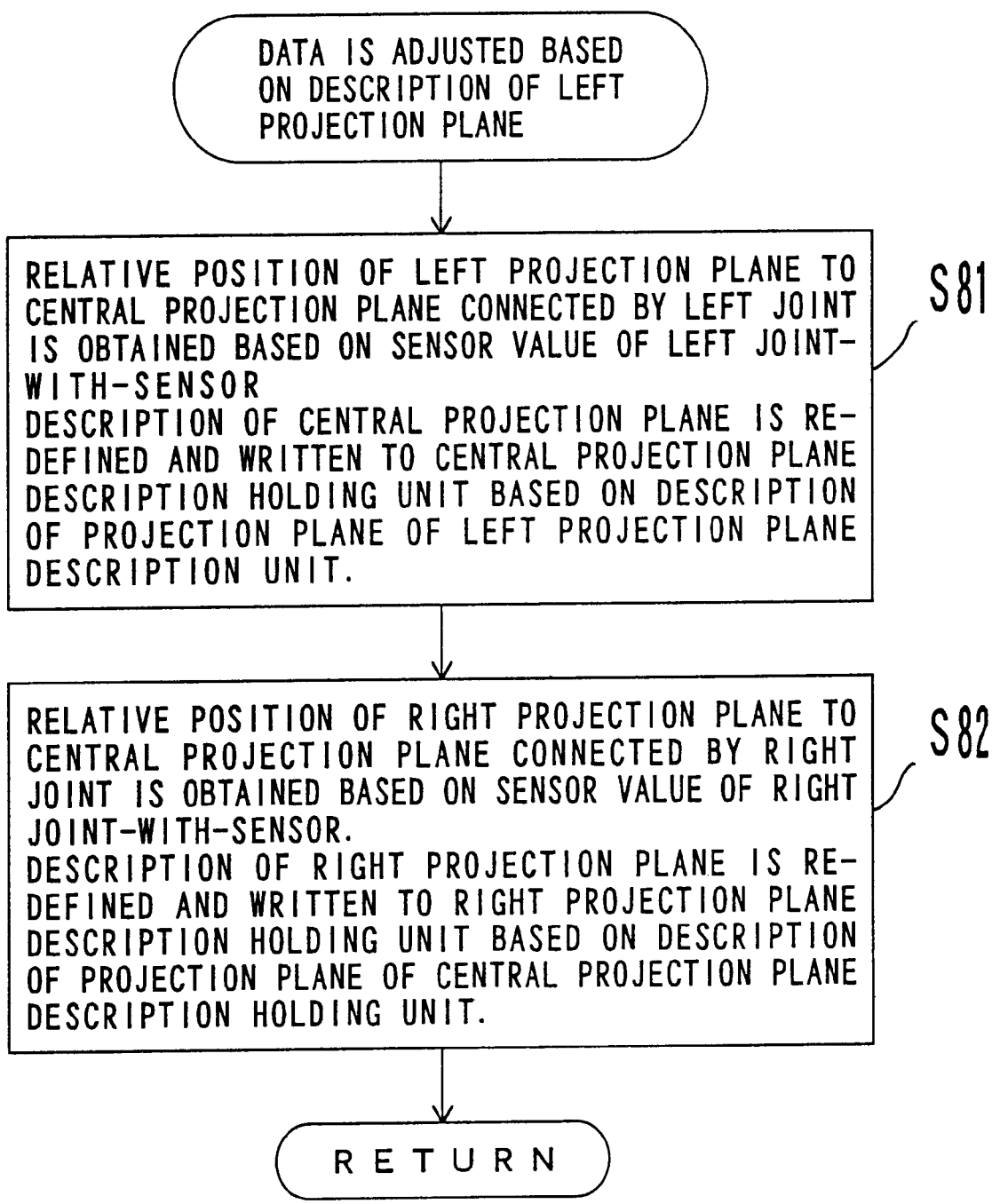
FIG. 16 is a flowchart showing an adjusting process based on the description of the left projection plane.

FIG. 16 is a flowchart showing the process performed in step S55 shown in FIG. 14. First, the relative position of the left projection plane 6a to the central projection plane 6b connected by the left joint 7L, that is, the relative position and angle of the left projection plane 6a to the central projection plane 6b detected by the sensor of the left joint 7L, are obtained based on the sensor value of the left joint 7L with a sensor. Then, the position (the directions are the same) of the central projection plane 6b is computed from the obtained relative position and angle and the position of the left projection plane 6a. The resultant value is written to the central projection plane description holding unit 30b. For example, if the new position of the left projection plane 6a is input from the three-dimensional input unit 9 and the position of the left projection plane 6a has been changed, then the position of the central projection plane 6b is determined in a way that the sensor value of the left joint 7L can be maintained based on the changed left projection plane 6a. The obtained value of the position is written to the central projection plane description holding unit 30b. Thus, the position of the central projection plane 6b is changed with the change of the left projection plane 6a.

To alter the position of the right projection plane 6c based on the changed central projection plane 6b, the relative position of the right projection plane 6c to the central projection plane 6b connected by the right joint 7R is obtained based on the sensor value of the right joint 7R with a sensor. That is, the relative position and angle of the right projection plane 6c are obtained based on the central projection plane 6b. Then, the position and direction of the right projection plane 6c are obtained based on the description of the changed central projection plane. The results are written to the right projection plane description holding unit 30c.

If the position and direction of the left projection plane 6a are changed in the above described processes, the positions and directions of the central projection plane 6b and right projection plane 6c are correspondingly altered, and the results arcs stored in the central projection plane description holding unit 30b and the right projection plane description holding unit 30c, then control is passed to step S52 shown in FIG. 14 and the contents of all the projection plane description holding units 30a through 30c are written back to the projection plane description units 3a through 3c. If the position and direction of the left projection plane 6a have been changed in these processes, the positions of the central projection plane 6b and the right projection plane 6c are changed based on the left projection plane 6a.

If the discrimination in step S54 shown in FIG. 14 is NO, that is, if the description of the left projection plane 6a has not been changed, then control is passed to step S56 and it is determined whether or not the description of the right projection plane 6c has been changed. If the description of the right projection plane 6c has been changed, then the descriptions of the central and left display screen units 6b and 6a are adjusted based on the right projection plane 6c (step S57 shown in FIG. 14).

Figure 17:
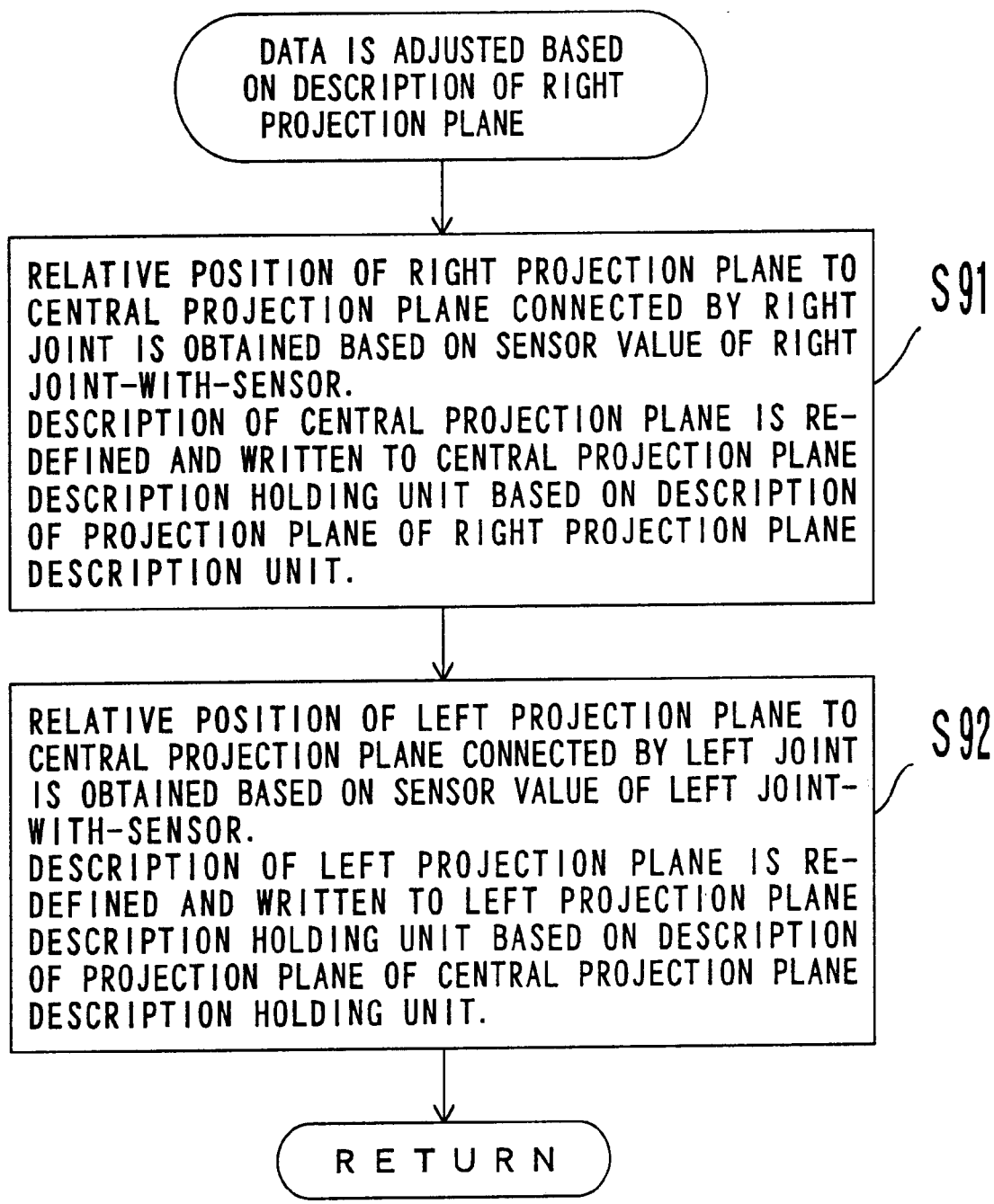
FIG. 17 is a flowchart showing an adjusting process based on the description of the right projection plane.

FIG. 17 is a flowchart showing the process in step S57. First, to determine the position and direction of the central projection plane 6b, the relative position of the right projection plane 6c to the central projection plane 6b connected by the right joint 7R is obtained based on the sensor value of the right joint 7R with a sensor as in the above described case based on the left projection plane 6a. Then, the position and direction of the central projection plane 6b are obtained based on the position and direction of the changed right projection plane description unit 3c. Thus, the position and direction of the central projection plane 6b relative to the changed right projection plane 6c have been determined, and the results are written to the central projection plane description holding unit 30b (step S91 shown in FIG. 17).

Next, to determine the position and direction of the left projection plane 6a relative to the changed central projection plane 6b, the relative position of the left projection plane 6a to the central projection planes 6b connected by the left joint 7L is obtained based on the sensor value of the left joint 7L with a sensor. Then, the position and direction of the left projection plane 6a are obtained based on the description of the changed central projection plane 6b stored in the central projection plane description holding unit 30b. The obtained position and direction are written to the left projection plane description holding unit 30a (step S92).

If the projection adjusting process has been completed when the description of the right projection plane 6c is changed as described above, then the process in step S52 shown in FIG. 14 is performed and the contents of all the projection plane description holding units 30a, 30b, and 30c are written back to the projection plane description units 3a through 3c. Thus, when the description of the right projection plane has been changed, the positions and directions of the central and left projection planes 6a and 6b can be changed correspondingly.

Figure 18:
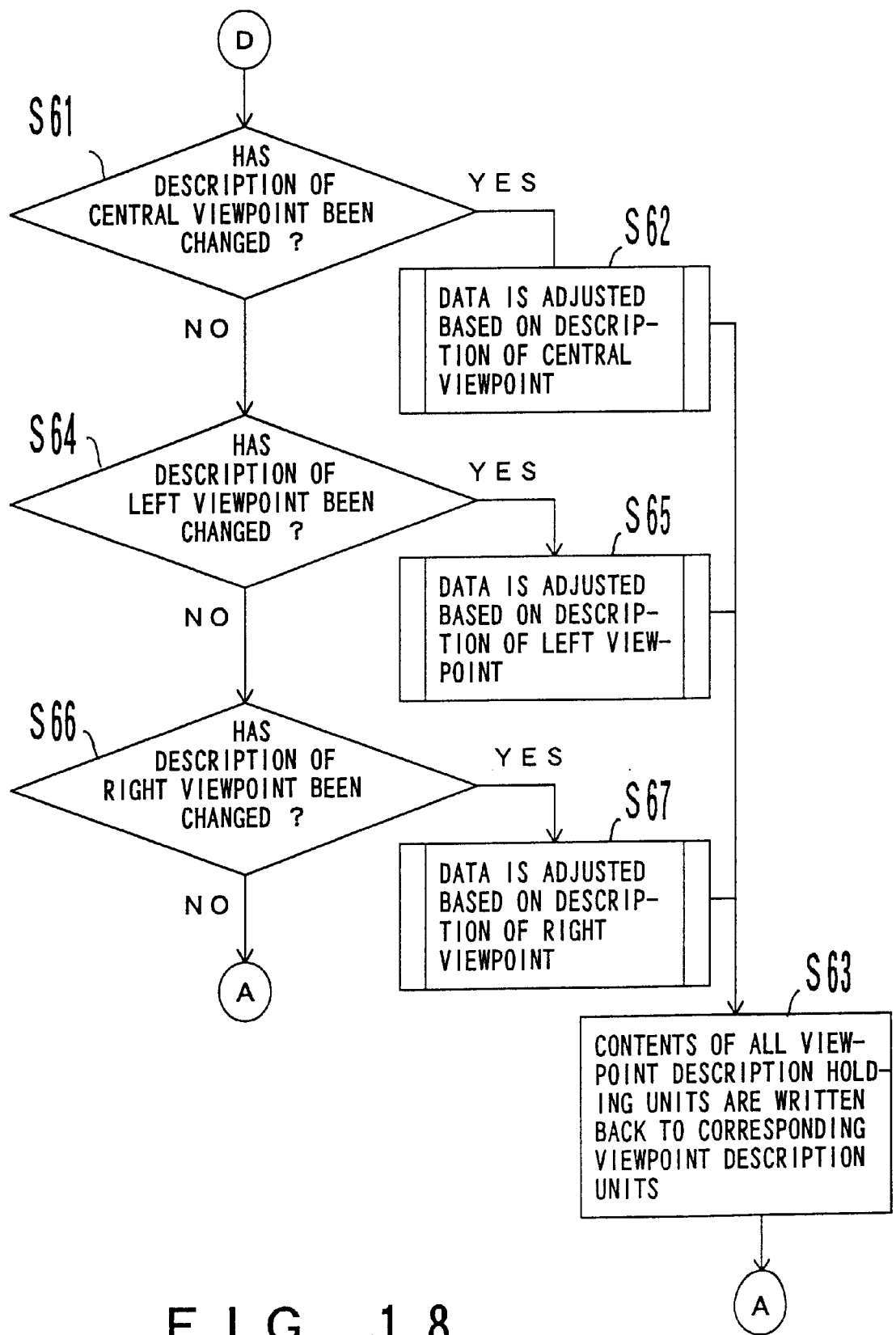
FIG. 18 is a flowchart showing the case in which the description of the viewpoint description unit has been changed.

If the discrimination in step S43 shown in FIG. 13 is NO, that is, if the description of a projection plane has not been changed, then the current values of the viewpoint description units 2a through 2c are compared with the values of the viewpoint description holding units 20a through 20c, and it is determined whether or not at least one of the values has been changed (step S44 shown in FIG. 13). If the discrimination is YES, the process in step S61 shown in FIG. 18 is performed. It is determined in step S61 whether or not the value of the central viewpoint description unit 2b has been changed. If the description of the central viewpoint has been changed, then the descriptions of the left and right viewpoints are adjusted based on the description of the central viewpoint (step S62).

Figure 19:
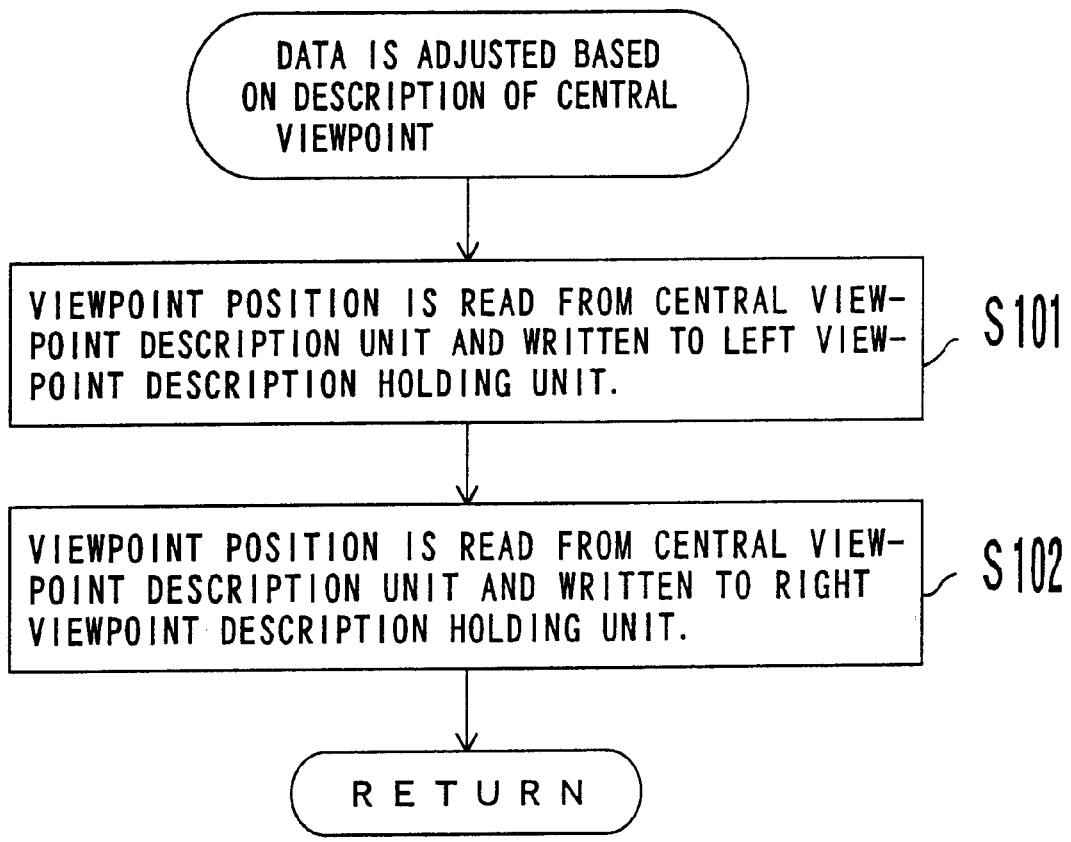
FIG. 19 is a flowchart showing an adjusting process based on the description of the central viewpoint.

FIG. 19 is a flowchart showing the process in step S62. According to the embodiment shown in FIG. 10, three viewpoints P1, P2, and P3 are the same. Therefore, if the central viewpoint has been changed, the position and direction of the viewpoint are read from the central viewpoint description unit 2b and the values are written to the left viewpoint description holding unit 20a (step S101 shown in FIG. 19). Similarly, the value read from the central viewpoint description unit 2b is written to the right viewpoint description unit 2c (step S102).

If the positions and directions of the left and right viewpoints are obtained as described above when the description of the central viewpoint is changed, then control is passed to step S63 shown in FIG. 18, and the contents of all the viewpoint description holding units 20a through 20c are written back to the corresponding viewpoint description units 2a through 2c, thereby terminating the adjustment of the viewpoint.

If the determination in step S61 shown in FIG. 18 is NO, then control is passed to step S64 and it is determined whether or not the description of the left viewpoint has been changed. As in the above described case where the central viewpoint has been changed, the values of the corresponding left viewpoint description unit 2a is compared with the value of the viewpoint description holding unit 20a, and it is determined whether or not these values match each other. If the description of the left viewpoint does not match, the descriptions of the central and right viewpoints are adjusted based on the description of the viewpoint description holding unit 20a (step S65).

Figure 20:
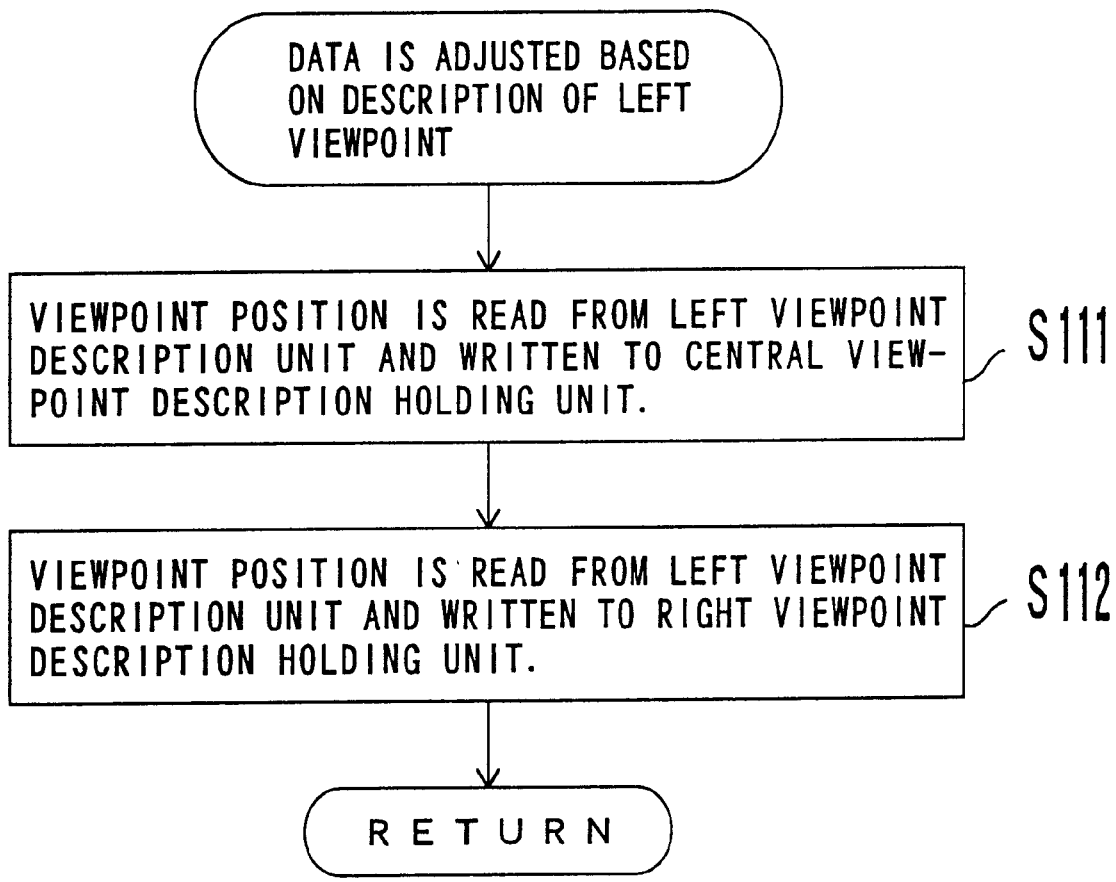
FIG. 20 is a flowchart showing an adjusting process based on the description of the left viewpoint.

FIG. 20 is a flowchart showing the process in step S65. Since the description of the left viewpoint is changed in this example, the position and direction of the viewpoint are read from the left viewpoint description unit 2a, and the read values are written to the central viewpoint description holding unit 20b(step S111 shown in FIG. 20). Similarly, the values read from the left viewpoint description unit 2a are written to the right viewpoint description holding unit 20c (step S112).

If the positions and directions of the central and right viewpoints are obtained when the position or direction of the left viewpoint has been changed as described above, then control is passed to step S63 shown in FIG. 18 and the contents of all the viewpoint description holding units 20a through 20c are written back to the viewpoint description units 2a through 2c.

If the discrimination in step S64 shown in FIG. 18 is NO, then control is passed to step S66, and it is determined whether or not the description of the right viewpoint has been changed. If the description of the right viewpoint has been changed, then the descriptions of the central and left viewpoints are changed based on the description of the right viewpoint description unit 2c (step S67 shown in FIG. 18).

Figure 21:
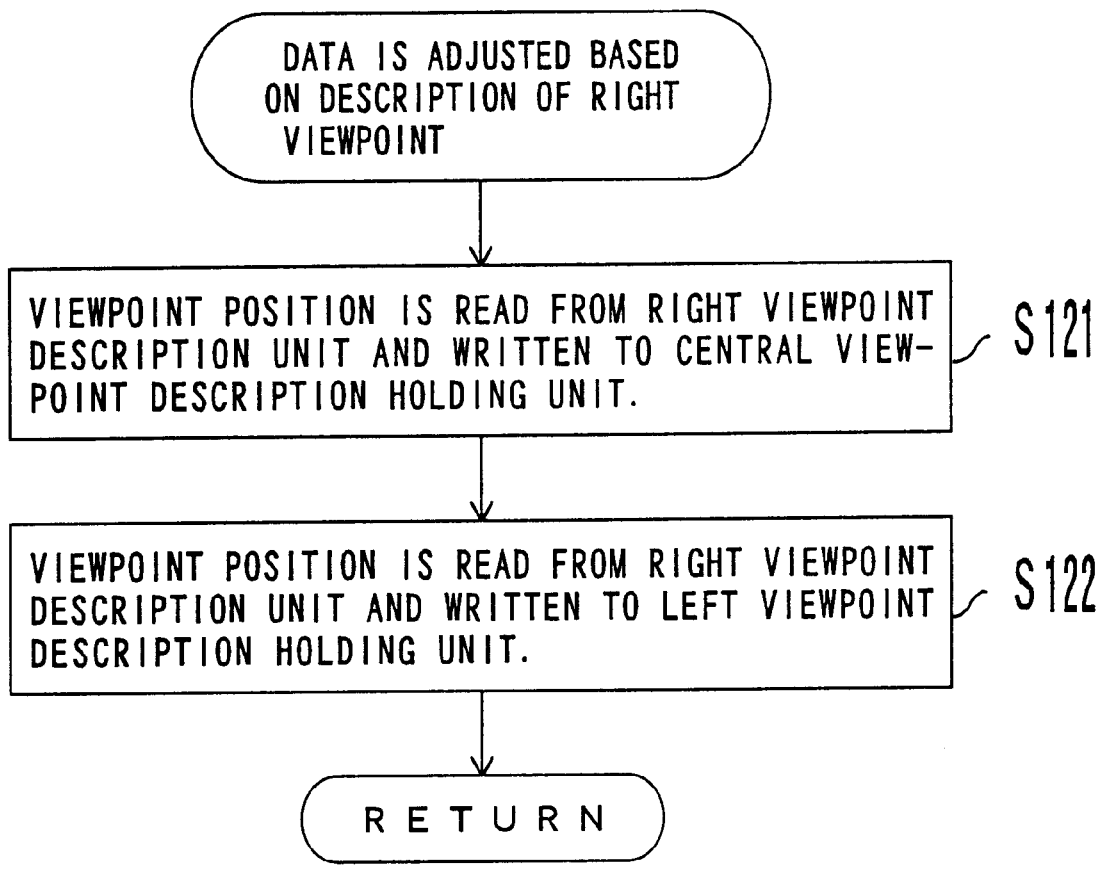
FIG. 21 is a flowchart showing an adjusting process based on the description of the right viewpoint.

FIG. 21 is a flowchart showing the process in step S67. Since the description of the right viewpoint is changed in this case, the position and direction of the viewpoint are read from the right viewpoint description unit 2c, and the read values are written to the central viewpoint description holding unit 20b (step S121). Similarly, the position and direction of the viewpoint are read from the right viewpoint description unit 2c, and the values are written to the left viewpoint description holding unit 20a (step S122).

Since the descriptions of the left and central viewpoints are completely altered after the description of the right viewpoint is changed as described above, control is passed to step S63 shown in FIG. 18, and the contents of all the viewpoint description holding units 20a through 20c are written back to the corresponding viewpoint description units 2a through 2c.

According to the present embodiment, when only one of the sensor value, the values of the viewpoint description units 2a through 2c, and the values of the projection plane description units 3a through 3c changes at a time, the projection adjusting unit adjusts other values based on the changed value. If a plurality of values are sequentially changed, the projection adjustment is performed on the first changed value of all, and the projection adjustment is sequentially performed on the subsequently changed values, then the projection planes and the descriptions of the viewpoints can be changed with the changes of all values.

Figure 22:
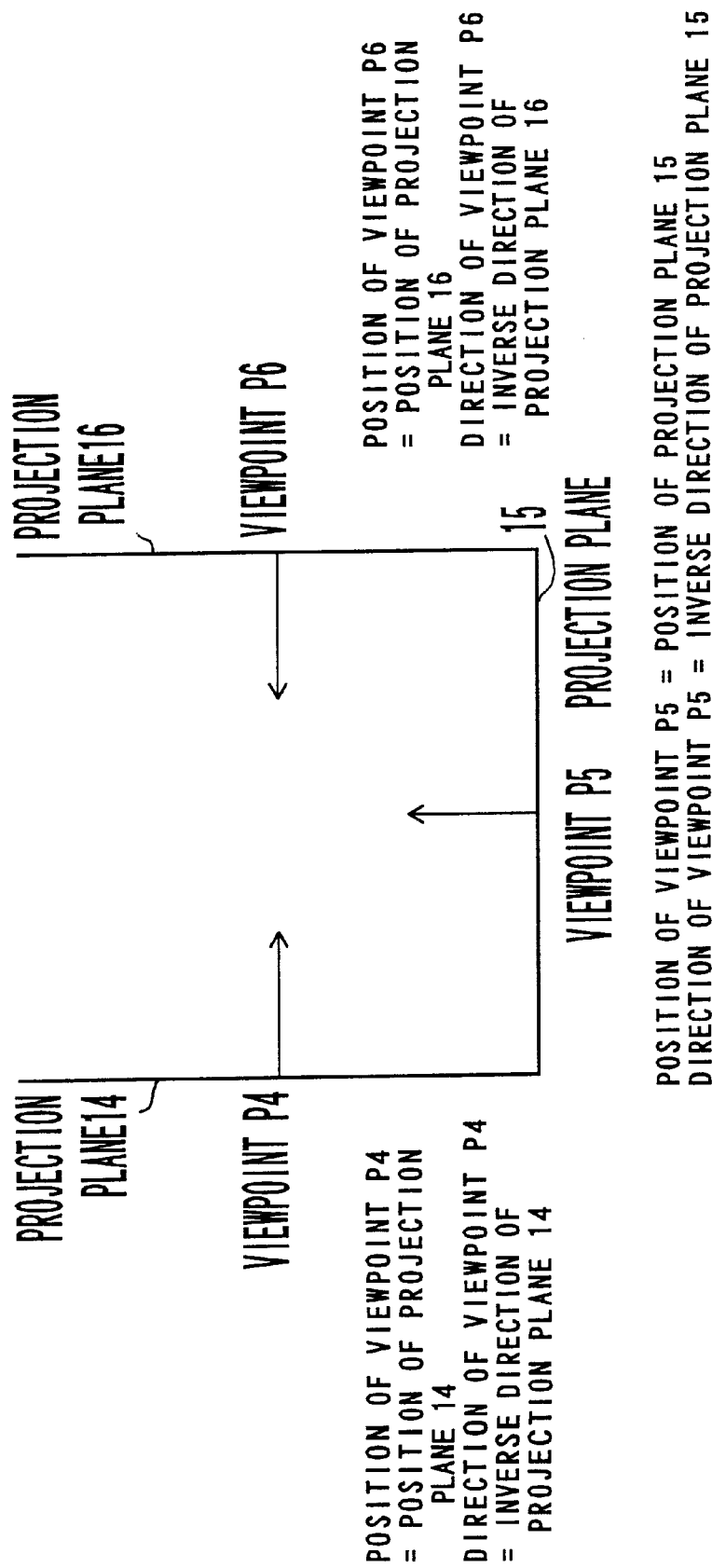
FIG. 22 shows the relationship between a projection plane and a viewpoint according to the second embodiment of the present invention.

FIG. 22 shows an example of a model which is made from a three-dimensional computer graphics model and viewed from outside. That is, FIG. 22 shows an example of an application in which a three-dimensional computer graphics model can be freely observed from the user-specified position and direction. As compared with the case in which a relatively small model is observed and a single projection plane is provided, a model can be observed from various viewpoints without rotating the model, and a plurality of users can simultaneously observe the same model from a plurality of viewpoints.

The direction of each of the viewpoints P4, P5, and P6 is opposite the direction of each of the projection planes 14, 15, and 16 respectively. The position of each of the viewpoints P4, P5, and P6 matches the position of each of the projector planes 14, 15, and 16. The object model is projected using a light parallel to the direction of each of the viewpoints P4, P5, and P6. The object model is projected using a light emitted from the position of each of the projection planes in practically the same manner as the case where the position of each of the viewpoints P4, P5, and P6 is defined as an infinitely distant point in the normal direction of each of the projection planes 14, 15, and 16.

The two-dimensional image of the three-dimensional computer graphics model 10 projected on the projection planes 14, 15, and 16 shown in FIG. 12 is displayed on the display screen units 6a through 6c. FIG. 13 shows a display example in which the three-dimensional computer graphics model 10 is placed apart from the projection planes 14 through 16 in FIG. 12. FIG. 14 shows a display example in which the three-dimensional computer graphics model 10 is placed close to the angle made by the projection planes 14 and 15.

As shown in FIGS. 23 and 24, the three-dimensional computer graphics model 10 is placed inside the projection planes 14, 15, and 16. When the model is viewed from the three viewpoints P4, P5, and P6, the front view of the three-dimensional computer graphics model 10 is displayed on the display screen unit 6b (projection plane 15). The left-side view of the three-dimensional computer graphics model 10 is displayed on the display screen unit 6a (projection plane 14). The right-side view of the three-dimensional computer graphics model 10 is displayed on the display screen unit 6c (projection plane 16).

Figure 25:
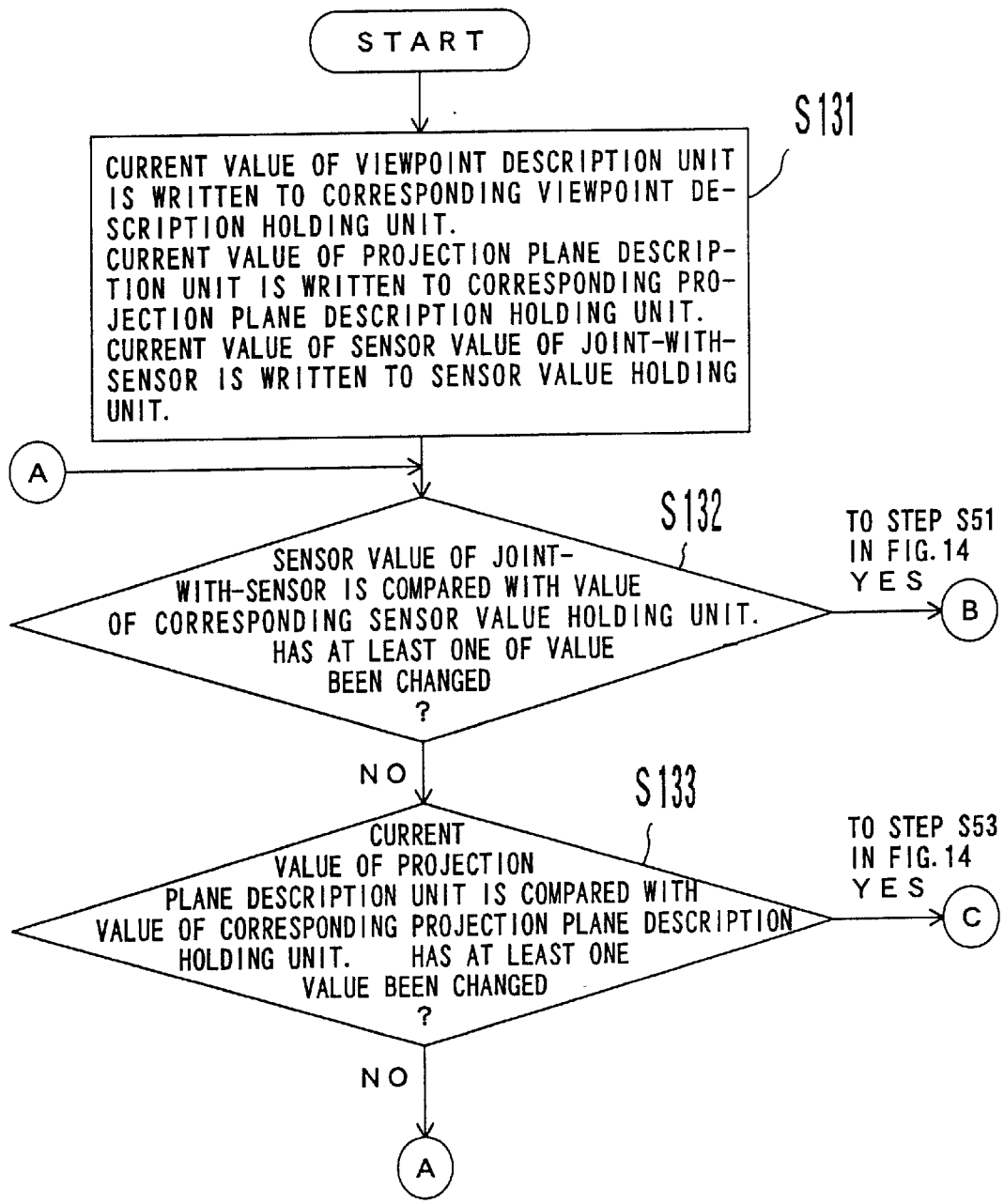
FIG. 25 is a flowchart showing the process of detecting a change in a sensor value and projection plane description according to the second embodiment of the present invention.

The projection adjusting process, according to the second embodiment shown in FIG. 22, performed when a sensor value or the description of a projection plane has been changed is described by referring to FIG. 25. According to this embodiment, a three-dimensional computer graphics model 10 is observed from outside, and each viewpoint matches the corresponding projection plane in position, but is opposite in direction as shown in FIG. 22. In this case, the values of the descriptions of the three viewpoints depend on the values of the descriptions of the projection planes. Therefore, only a change in a sensor value except the change in the description of a viewpoint, and only a change in description of a projection plane are detected in the flowchart of FIG. 25.

The processes in steps S131, S132, and S133 shown in FIG. 25 are the same as the processes in steps S41, S42, and S43 shown in FIG. 13. That is, in step S131, the values of the viewpoint description units 2a through 2c are written to the corresponding viewpoint description holding units 20a, 20b, and 20c, the sensor values of the joints 7L and 7R with sensors are written to the sensor value holding units 70L and 70R, and the current values of the projection plane description units 3a through 3c are written to the projection plane description holding units 30a, 30b, and 30c.

In step S132, the values of the sensors are compared with the values of the sensor values holding units 70L and 70R. If at least one different value is detected, then control is passed to step S51 shown in FIG. 14, and the positions and directions of the left and right projection planes 6 are altered based on the position and direction of the central projection plane 6b.

If the discrimination in step S132 shown in FIG. 25 is NO, then the current values of the projection plane description units 3a through 3c are compared with the values of the corresponding projection plane description holding units 30a and 30b. If at least one non-matching value is detected, the processes in and after step S53 shown in FIG. 14 are performed.

As described above, the three-dimensional computer graphics model 10 viewed from one viewpoint and the three-dimensional computer graphics model 10 viewed from a plurality of viewpoints can be displayed by entering the viewpoint information from the three-dimensional input unit 9. If the relative positions (angle or distance) of a plurality of display screens are changed, the relative positions of the plurality of display screens are automatically detected by the output of the sensor values from the joints 7L and 7R with sensors. Correspondingly, the contents of the projection plane description units 3a through 3c are automatically updated and an image is displayed depending on the relative positions of the display screens.

With the change in relative positions of the display screens, the contents of the projection plane description units 3a through 3c, etc. are automatically updated as described by referring to the projection adjustments and the display examples shown in FIGS. 10 through 24. Therefore, the detailed explanation is skipped here.

As described above by referring to the configuration example shown in FIG. 1, the position and direction of the viewpoint are set in the viewpoint description unit 2, and the position and direction of the projection plane are set in the projection plane description unit 3. However, the descriptions of the viewpoint and projection planes are not limited to these applications, and any other description methods can be accepted as long as the three-dimensional computer graphics model can be projected on a two-dimensional plane. Furthermore, a device for issuing an instruction to nullify a specified viewpoint description unit 2 or projection plane description unit 3, or an instruction to suppress the adjustment of the projection by the projection adjusting unit 8 can be provided to use a plurality of display screen units 6 as independent display devices.

As described above, since the relative positions of a plurality of display screens can be freely altered using joints according to the present invention, a three-dimensional computer graphics model can be viewed in various directions from outside, or can be viewed from inside of the model. Therefore, the three-dimensional computer graphics model can be quickly recognized without giving a heavy load onto an application program, operator, etc. processing the three-dimensional computer graphics model.

What is claimed is:

1. A two-dimensional image display device for a three-dimensional computer graphics model, comprising:
    a plurality of display screen units;
    a joint for connecting adjacent display screen units, and adjusting at least one of relative positions or relative angles of the adjacent display screen units; and
    a plurality of sensors for measuring at least one of the relative positions or the relative angles of the adjacent display screen units.

2. The two-dimensional image display device for the three-dimensional computer graphics model according to claim 1, wherein
    said plurality of display screen units display a two-dimensional image when the three-dimensional computer graphics model is observed from one viewpoint.

3. The two-dimensional image display device for the three-dimensional computer graphics model according to claim 1, wherein
    said plurality of display screen units can display the two-dimensional image obtained by observing the three-dimensional computer graphics model from one or more viewpoints corresponding to the plurality of display screen units.

4. The two-dimensional image display device for the three-dimensional computer graphics model according to claim 1, further comprising:
    a model storage unit for storing the three-dimensional computer graphics model;
    one or more viewpoint description units for holding viewpoint information based on which the three-dimensional computer graphics model is observed;
    a projection plane description unit corresponding to the plurality of display screen units for holding projection plane information about a two-dimensional plane obtained by projecting the three-dimensional computer graphics model based on the viewpoint information held by said viewpoint description unit;
    a plurality of image generating units corresponding to the plurality of display screen units for generating a two-dimensional image from the three-dimensional computer graphics model based on contents held by said viewpoint description unit and said projection plane description unit;
    a plurality of image storage units corresponding to the plurality of display screen units for storing the generated two-dimensional image; and
    a projection adjusting unit for adjusting the contents held by said viewpoint description unit or said projection plane description unit based on sensor values input from said plurality of sensors.

5. The two-dimensional image display device for the three-dimensional computer graphics model according to claim 3, further comprising:
    a model storage unit for storing the three-dimensional computer graphics model;
    one or more viewpoint description units for holding viewpoint information based on which the three-dimensional computer graphics model is observed;
    a projection plane description unit corresponding to the plurality of display screen units for holding projection plane information about a two-dimensional plane obtained by projecting the three-dimensional computer graphics model based on the viewpoint information held by said viewpoint description unit;
    a plurality of image generating units corresponding to the plurality of display screen units for generating a two-dimensional image from the three-dimensional computer graphics model based on contents held by said viewpoint description unit and said projection plane description unit;
    a plurality of image storage units corresponding to the plurality of display screen units for storing the generated two-dimensional image; and
    a projection adjusting unit for adjusting the contents held by said viewpoint description unit or said projection plane description unit based on sensor values input from said plurality of sensors.

6. The two-dimensional image display device for the three-dimensional computer graphics model according to claim 5, further comprising:
    a three-dimensional input unit for receiving an instruction from an operator and altering the viewpoint information held by said viewpoint description unit or the projection plane information held by said projection plane description unit, wherein
    said projection adjusting unit adjusts the viewpoint information or the projection plane information to alter the two-dimensional image displayed on the display screen unit when at least one change is detected in the sensor values of the plurality of sensors, the viewpoint information, and the projection plane information altered according to the instruction input from said three-dimensional input unit.

7. The two-dimensional image display device for the three-dimensional computer graphics model according to claim 5, wherein
    said plurality of sensors include:
        a left sensor for measuring a relative position or a relative angle of a left display screen unit to a central display screen unit; and
        a right sensor for measuring a relative positions or a relative angle of a right display screen unit to the central display screen unit, wherein
    when at least one sensor value is changed, said projection adjusting unit obtains the relative position or relative angle of a left projection plane to a central projection plane based on the sensor value of the left sensor, obtains projection plane information about the left projection plane based on a projection plane description of the central projection plane, writes the obtained projection plane information of the left projection plane to said projection plane description unit, obtains the relative position or relative angle of a right projection plane to a central projection plane based on the sensor value of the right sensor, obtains projection plane information about the right projection plane based on a projection plane description of the central projection plane stored in said projection plane description unit, and writes the obtained projection plane information of the right projection plane to said projection plane description unit.

8. The two-dimensional image display device for the three-dimensional computer graphics model according to claim 5, wherein when a projection plane description of said projection plane description unit is changed, said projection adjusting unit first obtains a relative position or a relative angle of a changed projection plane to a central projection plane based on the sensor value of a sensor connected to the changed projection plane, obtains projection plane information about the central projection plane based on the projection plane description of the changed projection plane, writes the obtained projection plane information about the central projection plane to said projection plane description unit, obtains a relative position or a relative angle of another projection plane to the central projection plane based on a sensor value of a sensor connected to the other projection plane, obtains projection plane information about the other projection plane based on the projection plane description about the central projection plane, and writes the obtained projection plane information about the other projection plane to said projection plane description unit.

9. The device according to claim 1, further comprising:

a model storage unit for storing the three-dimensional computer graphics model;

one or more viewpoint description units for holding viewpoint information based on which the three-dimensional computer graphics model is observed;

a projection plane description unit corresponding to the plurality of display screen units for holding projection plane information about a two-dimensional plane obtained by projecting the three-dimensional computer graphics model based on the viewpoint information held by said viewpoint description unit;

a projection adjusting unit for adjusting the contents held by said viewpoint description unit or said projection plane description unit based on sensor values input from said plurality of sensors;

a plurality of image generating units corresponding to the plurality of display screen units for generating a two-dimensional image from the three-dimensional computer graphics model based on contents held by said viewpoint description unit and said projection plane description unit; and a display control unit for displaying the two dimensional image generated by said plurality of image generating units on said plurality of display screen units.

10. A method of displaying a two-dimensional image for a three-dimensional computer graphics model, comprising the steps of:

connecting adjacent display screen units and adjusting at least one of relative position and a relative angle of the adjacent display screens; and measuring using a plurality of sensors at least one of the relative position and the relative angle of the adjacent display screen units.

11. The method according to claim 10, further comprising the steps of:

storing the three-dimensional computer graphics model;

storing viewpoint information based on which the three-dimensional computer graphics model is observed;

storing projection plane information about a two-dimensional plane obtained by projecting the three-dimensional computer graphic model based on the viewpoint information;

adjusting the viewpoint information or the projection plane information based on sensor values input from said plurality of sensors;

generating a plurality of two-dimensional images from the three-dimensional computer graphics model based on the viewpoint information and the projection plane information; and displaying the generated two-dimensional images on corresponding display screen units.

12. The method according to claim 10, further comprising the steps of:

storing the three-dimensional computer graphics model;

storing viewpoint information based on which the three-dimensional computer graphics model is observed;

storing projection plane information about a two-dimensional plane obtained by projecting the three-dimensional computer graphic model based on the viewpoint information;

adjusting the viewpoint information or the projection plane information based on sensor values input from said plurality of sensors;

generating a plurality of two-dimensional images from the three-dimensional computer graphics model based on the viewpoint information and the projection plane information; and storing the generated two-dimensional images.

13. A two-dimensional image display system for a three-dimensional computer graphics model, comprising:

an image display device, comprising:
a plurality of display screen units;
a joint for connecting adjacent display screen units, and adjusting at least one of relative positions and relative angles of the adjacent display screen units; and
a plurality of sensors for measuring at least one of the relative positions and the relative angles of the adjacent display screen units; and an image display control device comprising:
a model storage unit for storing the three-dimensional computer graphics model;
one or more viewpoint description units for holding viewpoint information based on which the three-dimensional computer graphics model is observed;
a projection plane description unit corresponding to the plurality of display screen units for holding projection plane information about a two-dimensional plane obtained by projecting the three-dimensional computer graphics model based on the viewpoint information held by said viewpoint description unit;
a projection adjusting unit for adjusting the contents held by said viewpoint description unit or said projection plane description unit based on sensor values input from said plurality of sensors;

a plurality of image generating units corresponding to the plurality of display screen units for generating a two-dimensional image from the three-dimensional computer graphics model based on contents held by said viewpoint description unit and said projection plane description unit; and a display control unit for displaying the two dimensional image generated by said plurality of image generating units on said plurality of display screen units.

14. A computer-readable storage medium on which is recorded a program for causing a computer to perform the steps of:

measuring a relative position or a relative angle of display screen units which are connected in such a way that either the relative position or the relative angle, or both the relative position and the relative angle of adjacent display screen units are adjustable;

generating a plurality of two-dimensional images to be displayed on the display screen units, from a three-dimensional computer graphics model based on the measured relative position or relative angel of the display screen units; and displaying each of the generated two-dimensional images on the corresponding display screen unit.

15. The storage medium according to claim 14, further performing the steps of:

storing the three-dimensional computer graphics model;

storing viewpoint information based on which the three-dimensional computer graphics model is observed;

storing projection plane information about a two-dimensional plane obtained by projecting the three dimensional computer graphic model based on the viewpoint information;

adjusting the viewpoint information or the projection plane information based on the measure relative position or the relative angle of the display screen unit;

generating a plurality of two-dimensional image from the three-dimensional computer graphics model based on the viewpoint information and the projection plane information; and displaying the generated two-dimensional images corresponding display screen units.

* * * * *

UNITED STATES PATENT AND TRADEMARK OFFICE
CERTIFICATE OF CORRECTION

PATENT NO.: 6,020,890
DATED : February 1, 2000
INVENTOR(S): Youji KOHDA

It is certified that an error appears in the above-identified patent and that said Letters Patent is hereby corrected as shown below:

Col. 19, line 24, change "angel" to --angle--.

Signed and Sealed this

Twenty-eighth Day of November, 2000

Attest:

Q. TODD DICKINSON

Attesting Officer

Director of Patents and Trademarks